United States Patent
Huntington et al.

(10) Patent No.: US 11,840,944 B2
(45) Date of Patent: Dec. 12, 2023

(54) MULTIPLE LOOP POWER GENERATION USING SUPER CRITICAL CYCLE FLUID WITH SPLIT RECUPERATOR

(71) Applicant: XYZ Energy Group, LLC, Spring, TX (US)

(72) Inventors: Richard Alan Huntington, Spring, TX (US); Frank F. Mittricker, Jamul, CA (US); Loren K. Starcher, Longboat Key, FL (US)

(73) Assignee: XYZ ENERGY GROUP, LLC, Spring, TX (US)

( * ) Notice: Subject to any disclaimer, the term of this patent is extended or adjusted under 35 U.S.C. 154(b) by 0 days.

(21) Appl. No.: 17/543,319

(22) Filed: Dec. 6, 2021

(65) Prior Publication Data
US 2022/0178278 A1    Jun. 9, 2022

Related U.S. Application Data

(60) Provisional application No. 63/122,367, filed on Dec. 7, 2020.

(51) Int. Cl.
*F01K 7/32*    (2006.01)
*F01K 19/10*    (2006.01)
(Continued)

(52) U.S. Cl.
CPC .............. *F01K 7/32* (2013.01); *F01K 13/00* (2013.01); *F01K 19/10* (2013.01); *F01K 25/103* (2013.01); *F02C 1/04* (2013.01)

(58) Field of Classification Search
CPC .......... F01K 7/32; F01K 25/103; F01K 13/00; F01K 13/006; F01K 13/02; F01K 19/00;
(Continued)

(56) References Cited

U.S. PATENT DOCUMENTS 3,029,197 A    4/1962    Untermyer
3,756,023 A    9/1973    Berman
(Continued)

FOREIGN PATENT DOCUMENTS

DE    102010025504 A1    12/2011
DE    102013016461 A1 *    4/2015    ........... F01K 17/005
JP    2013147996 A    8/2013

OTHER PUBLICATIONS

"Modeling and Analysis of a printed circuit heat exchanger for supercritical CO2 power cycle applications", Ajinkya Meshram et al., Applied Thermal Engineering, vol. 109 Part B, Oct. 26, 2016, pp. 861-870.
(Continued)

*Primary Examiner* — Mark A Laurenzi
*Assistant Examiner* — Xiaoting Hu
(74) *Attorney, Agent, or Firm* — Edmonds & Cmaidalka, P.C.

(57) ABSTRACT

Systems and methods for transferring and converting heat to a power cycle using a plurality of heat transfer fluids, loops and heat exchange devices to convert heat to useful work and/or power. Power is generated using intermediate heat transfer loops (IHTL) and an intermediate heat transfer fluid (IHTF) to cool the hot exhaust power cycle fluid (PCF) stream that is at or above its critical conditions. The temperature of the IHTF can be increased by 100° C., 150° C., 200° C., 250° C., 300° C., 350° C., 400° C., 450° C., 500° C., 550° C. or more by exchanging heat with the PCF, either directly or indirectly.

17 Claims, 18 Drawing Sheets

(51) Int. Cl.
  *F01K 25/10*      (2006.01)
  *F01K 13/00*      (2006.01)
  *F02C 1/04*       (2006.01)

(58) Field of Classification Search
  CPC .......... F01K 19/02; F01K 19/04; F01K 19/10; F02C 1/00; F02C 1/002; F02C 1/005; F02C 1/04; F02C 1/05; F02C 1/10; F02C 1/105
  See application file for complete search history.

(56) References Cited

U.S. PATENT DOCUMENTS

| | | | |
|---|---|---|---|
| 4,057,966 A | 11/1977 | Prutkovsky et al. | |
| 4,253,300 A | 3/1981 | Willyoung | |
| 4,362,149 A | 12/1982 | Thomson | |
| 4,428,201 A | 1/1984 | Carson | |
| 4,498,289 A * | 2/1985 | Osgerby | F02C 6/003 60/647 |
| 4,668,494 A | 5/1987 | Van Hook | |
| 4,768,345 A | 9/1988 | Kardas | |
| 5,242,563 A | 9/1993 | Stern et al. | |
| 5,862,800 A | 1/1999 | Marko | |
| 6,041,588 A | 3/2000 | Bruckner et al. | |
| 6,701,711 B1 | 3/2004 | Litwin | |
| 6,957,536 B2 | 10/2005 | Litwin et al. | |
| 7,051,529 B2 | 5/2006 | Murphy et al. | |
| 8,365,529 B2 | 2/2013 | Litwin et al. | |
| 8,594,268 B2 | 11/2013 | Shu | |
| 9,368,244 B2 | 6/2016 | Woolley | |
| 9,624,912 B2 | 4/2017 | Shim et al. | |
| 9,816,490 B2 | 11/2017 | Conlon | |
| 2004/0182081 A1 | 9/2004 | Sim et al. | |
| 2004/0250998 A1 | 12/2004 | Charron | |
| 2004/0251006 A1 | 12/2004 | Marin et al. | |
| 2005/0126170 A1 | 6/2005 | Litwin | |
| 2006/0201148 A1 | 9/2006 | Zabtcioglu | |
| 2009/0090111 A1 | 4/2009 | Tomlinson et al. | |
| 2012/0285167 A1 | 11/2012 | Horek et al. | |
| 2013/0139509 A1 | 6/2013 | Berti et al. | |
| 2013/0180520 A1 | 7/2013 | Raade et al. | |
| 2013/0224078 A1 | 8/2013 | Van Grambezen et al. | |
| 2014/0033676 A1 | 2/2014 | Pang et al. | |
| 2014/0075939 A1 | 3/2014 | Aga et al. | |
| 2016/0298500 A1 * | 10/2016 | Peter | F02C 1/10 |
| 2018/0003085 A1 | 1/2018 | Uechi et al. | |
| 2019/0300130 A1 | 10/2019 | Curts et al. | |
| 2019/0301309 A1 * | 10/2019 | Huntington | F01K 13/006 |
| 2021/0254511 A1 * | 8/2021 | Brumbaugh | F01K 13/02 |

OTHER PUBLICATIONS

"Innovative power generation systems using supercritical CO2 cycles", Qian Zhu, Clean Energy, vol. 1, Issue 1, Dec. 2017, pp. 68-79.
"Exergy, economic and environmental impact assessment and optimization of a novel cogeneration system including a gas turbine, a supercritical CO2 and an organic Rankine cycle (GT-HRSG/SCO2)", Hossein Nami et al., Applied Thermal Engineering, vol. 110, 2017, pp. 1315-1330.
"Physical model development and optimal design of PCHE for intermediate heat exchangers in HTGRs", In Hun Kim et al., Nuclear Engineering and Design, vol. 243, 2012, pp. 243-250.
"Numerical study on thermal hydraulic performance of a Printed Circuit Heat Exchanger", Justin Figley et al., Progress in Nuclear Energy, vol. 68, 2013, pp. 89-96.
"CFD aided approach to design printed circuit heat exchangers for supercritical CO2 Brayton cycle application", Seong Gu Kim et al., Annals of Nuclear Energy, vol. 92, 2016, pp. 175-185.
"Economic analysis of SCO2 cycles with PCHE Recuperator design optimisation", D. Shiferaw et al., Heatric Division of Meggitt (UK) Ltd., Poole Dorset, UK; The 5th International Symposium—Supercritical CO2 Power Cycles Mar. 28-31, 2016, San Antonio, Texas.
"Design and Dynamic Modeling of Printed Circuit Heat Exchangers for Supercritical Carbon Dioxide Brayton Power Cycles", Yuan Jiang et al., National Energy Technology Laboratory, 3610 Collins Ferry Rd, Morgantown, WV 26507, USA, and Department of Chemical and Biomedical Engineering, West Virginia University, Morgantown, WV 26506, USA.
"A review of printed circuit heat exchangers for helium and supercritical CO2 Brayton cycles", Lei Chai et al., Thermal Science and Engineering Progress, vol. 18, 2020, pp. 1-22.
"Performance Improvement Options for the Supercritical Carbon Dioxide Brayton Cycle", A. Moisseytsev et al., Nuclear Engineering Division, Argonne National Laboratory, Jun. 6, 2007, ANL-GenIV-103.
"A comparison of supercritical carbon dioxide power cycle configurations with an emphasis on CSP applications", T. Neises et al., Energy Procedia, vol. 49, 2014, pp. 1187-1196.
"An exergy analysis of recompression supercritical CO2 cycles with and without reheating", R. Vasquez Padilla et al., Energy Procedia, vol. 69, 2015, pp. 1181-1191.
"Supercritical Carbon Dioxide Applications for Energy Conversion Systems", Damiano Vitale Di Maio et al., Energy Procedia, vol. 82, 2015, pp. 819-824.
"Thermal performance and economic analysis of supercritical Carbon Dioxide cycles in combined cycle power plant", Dhinesh Thanganadar et al., Applied Energy, vol. 255, 2019, pp. 1-29.
"Supercritical CO2 Brayton Power Cycles: Potential & Challenges", Dr. Jeffrey N. Phillips, Electric Power Research Institute, 5th International Supercritical CO2 Power Cycles Symposium, Mar. 30, 2016.
Search Report and Written Opinion for PCT Application No. PCT/US19/24982 dated Jul. 22, 2019.
European Application No. 19778243.6, Extended Search Report dated Dec. 8, 2021.
International Search Report and Written Opinion for PCT Application No. PCT/US2021/062034 dated Feb. 18, 2022.
"Fluoride-Salt-Cooled High Temperature Reactor (FHR) Materials, Fuels and Components White Paper"; FHR Materials, Fuels and Components White Paper; Integrated Research Project Workshop 3; Department of Nuclear Engineering and Engineering Physics, University of Wisconsin, Madison; Jul. 2013.
"Alloys for Molten-Salt Reactors"; V.M. Azhazha et al.; National Science Center "Kharkov Institute of Physics and Technology"; Kharkov, Ukraine; pp. 40-47; 2005.
Generation IV International Forum, Proceedings, GIF Symposium; Paris, France; Sep. 9-10, 2009.
"Corrosion behavior of Hastelloy-N alloys in molten salt fluoride in Ar gas or in air"; Ken-ichi Fukumoto et al.; Journal of Nuclear Science and Technology, 52:10; pp. 1323-1327; 2015.
"Corrosion testing of nickel alloy for molten salt reactors"; P. Slama et al.; Journal of Achievements in Materials and Manufacturing Engineering, vol. 70, Issue 2; pp. 78-85; Jun. 2015.
"Corrosion Aspects of Compatible Alloys in Molten Salt (Flinak) Medium for Indian MSR Program in the Temperature Range of 550-750° C. Using Electrochemical Techniques"; S.J. Keny et al.; Thorium Energy Conference 2015; Mumbai, India; Oct. 12-15, 2015.
"Materials and Metals in MSR"; Presented by Victor Ignatiev; National Research Center "Kurchatov Institute"; Lecco, Italy; MSR Summer school, Jul. 2-4, 2017.
"Construction Materials for Molten-Salt Reactors"; W. D. Manly et al.; Fluid Fuel Reactors, Chapter 13, pp. 595-625; 1958.
"Material Corrosion in Molten Salt Reactors"; Joe Sundae; Submitted as coursework for PH241, Stanford University, Winter 2017; Feb. 21, 2017.
"Molten salt reactor research develops class of alloys"; World Nuclear News; http://www.world-nuclear-news.org/NN-Molten-salt-reactor-research-develops-class-of-alloys-08021701.html; Feb. 8, 2017.
"Molten Salt Reactors"; Yousif Kelaita; Submitted as coursework for PH241, Stanford University, Winter 2015; Feb. 18, 2015.

(56) References Cited

OTHER PUBLICATIONS

"Molten Salts for High Temperature Reactors: University of Wisconsin Molten Salt Corrosion and Flow Loop Experiments—Issues Identified and Path Forward"; Piyush Sabharwall et al.; Idaho National Laboratory; Mar. 2010.
"Compatibility Studies of Potential Molten-Salt Breeder Reactor Materials in Molten Fluoride Salts"; J.R. Keiser; Oak Ridge National Laboratory; ORNL/TM-5783; May 1977.
"Technical Description of the "Mark 1" Pebble-Bed Fluoride-Salt-Cooled High-Temperature Reactor (PB-FHR) Power Plant"; Charalampos "Harry" Andreades et al.; Mark-1 PB-FHR Technical Description; Department of Nuclear Engineering, University of California, Berkeley; Sep. 30, 2014.
"Molten salts database for energy applications"; R. Serrano-Lopez et al.; Preprint submitted to Chemical Engineering & Processing: Process Intensification; Sep. 17, 2013.
"Components and Systems Development for Molten-Salt Breeder Reactors"; Dunlap Scott et al.; Oak Ridge National Laboratory; ORNL-TM-1855; Jun. 30, 1967.
"Industrial Use of Molten Nitrate/Nitrite Salts"; R. W. Carling et al.; Sandia National Laboratories Energy Report; Albuquerque, New Mexico; Dec. 1981.
"Assessment of Candidate Molten Salt Coolants for the Advanced High-Temperature Reactor (AHTR)"; D. F. Williams et al.; Oak Ridge National Laboratory; ORNL-TM-2006/12; Mar. 2006.
"Molten Salt Storage"; John Dorado; Submitted as coursework for PH240, Stanford University, Fall 2015; Dec. 15, 2015.
"Engineering Database of Liquid Salt Thermophysical and Thermochemical Properties"; Manohar S. Sohal et al.; Idaho National Laboratory; Mar. 2010.
"Corrosion in Very High-Temperature Molten Salt for Next Generation CSP Systems"; Brenda Garcia Diaz et al.; Savannah River National Laboratory; Apr. 1, 2013.
"Molten Salt Coolants for High Temperature Reactors: A Literature Summary of Key R&D Activities and Challenges"; David Samuel; IAEA Internship Report; Inpro Cool; May 2009.
"Molten-Salt Reactor Experiment"; Wikipedia; https://en.wikipedia.org/wiki/Molten-Salt_Reactor_Experiment; May 18, 2017.
"HITEC Heat Transfer Salt"; Coastal Chemical Co., L.L.C.; Brenntag Company; Houston, TX.
"Experience with the Molten-Salt Reactor Experiment"; Paul Haubenreich et al.; Nuclear Applications & Technology, vol. 8; pp. 118-136; Feb. 1970.
ORNL Summary of the properties of candidate coolants.
"Design and Operation of Forced-Circulation Corrosion Testing Loops with Molten Salt"; J. L. Crowley et al.; Oak Ridge National Laboratory; ORNL-TM-528; May 1963.
"Design Study of a Heat-Exchange System for One MSBR Concept"; C. E. Bettis et al.; Oak Ridge National aboratory; ORNL-TM-1545; Sep. 1967.
"Assessment of Candidate Molten Salt Coolants for the NGNP/NHI Heat Transfer Loop"; D. F. Williams.; Oak Ridge National Laboratory; ORNL-TM-2006/69; Jun. 2006.
"Estimated Cost of Adding a Third Salt-Circulating System for Controlling Tritium Migration in the 1000-MW(e) MSBR"; Roy C. Robertson; Oak Ridge National Laboratory; ORNL-TM-3428; Jul. 1971.
"Heat Transfer Salt for High Temperature Steam Generation"; E. G. Bohlmann; Oak Ridge National Laboratory; ORNL-TM-3777; Dec. 1972.
"Corrosion and Mass Transfer Characteristics of NaBF4-NaF (92-8 mole %) in Hastelloy N"; J. W. Koger; Oak Ridge National Laboratory; ORNL-TM-3866; Oct. 1972.
"Status of Tellurium-Hastelloy N Studies in Molten Fluoride Salts"; J. R. Keiser; Oak Ridge National Laboratory; ORNL-TM-6002; Oct. 1977.
"Conceptual Design Characteristics of a Denatured Molten-Salt Reactor with Once-Through Fueling"; J. R. Engel et al.; Oak Ridge National Laboratory; ORNL-TM-7207; Jul. 1980.
"An Account of Oak Ridge National Laboratory's Thirteen Nuclear Reactors"; Murray W. Rosenthal; Oak Ridge National Laboratory; ORNL-TM-2009/181; Published Aug. 2009, Revised Mar. 2010.
"Revised Phase Diagram of the System NaF-NaBF4"; Jarmila Mlynarikova et al.; Monatshefte fuer Chemie/Chemical Monthly, 139, pp. 77-80 (2008); Springer-Verlag 2007; Published online Dec. 10, 2007.
"Surface tensions of some binary fused salt systems"; June Lomnes Dahl; Dissertation, Physical Chemistry; Iowa State College; 1957.
"High-Efficiency Thermodynamic Power Cycles for Concentrated Solar Power Systems"; Marc T. Dunham et al.; BYU ScholarsArchive; All Faculty Publications; Paper 1585; 2014.
"Supercritical Carbon Dioxide Brayton Cycle"; Quadrennial Technology Review 2015; Chapter 4: Advancing Clean Electric Power Technologies; U.S. Department of Energy.
"Review of Supercritical CO2 Power Cycle Technology and Current Status of Research and Development"; Yoonhan Ahn et al.; Nuclear Engineering and Technology 47, pp. 647-661; 2015.
"Critical thinking: Ultra and supercritical technology focus"; Paul Breeze; Power Engineering International; Mar. 23, 2017.
"Welcome to Presentation on Supercritical Boiler"; C. P. Sahoo; Adani Power Maharashtra LTD.
"Gas-Cooled Reactor Coolant Circulator and Blower Technology"; Proceedings of a Specialists Meeting Organized by the International Atomic Energy Agency; International Working Group on Gas-Cooled Reactors; IWGGCR/17; San Diego; Nov. 30-Dec. 2, 1987.
"Description of the Advanced Gas Cooled Type of Reactor (AGR)"; Erik Nonbol; Riso National Laboratory; Roskilde, Denmark; Nov. 1996.
"How an AGR power station works"; British Energy Group plc; 2006.
"High Temperature Issues in Advanced Gas Cooled Reactors (AGR)"; M. P. O'Donnell et al.; TAGSI/FESI Symposium 2013: Structural Integrity of Nuclear Power Plant.
"Heat exchanger." Merriam-Webster.com Dictionary, Merriam-Webster, https://www.merriam-webster.com/dictionaryheat%20exchanger. Accessed Dec. 16, 2020.
"What Are Supercritical CO2 Power Cycles?", Sonal Patel, Power Magazine, Apr. 1, 2019, https://www.powermag.com/what-are-supercritical-co2-power-cycles/.
"High Performance Printed Circuit Heat Exchanger", Nobuyoshi Tsuzuki et al., Applied Thermal Engineering, vol. 27, 2007, pp. 1702-1707.
"Optimization of fin arrangement and channel configuration in an airfoil fin PCHE for supercritical CO2 cycle", Kiangyang Xu et al., Applied Thermal Engineering, vol. 70, 2014, pp. 867-875.

* cited by examiner

MULTIPLE LOOP POWER GENERATION USING SUPER CRITICAL CYCLE FLUID WITH SPLIT RECUPERATOR

CROSS-REFERENCE TO RELATED APPLICATIONS

This application claims priority to U.S. Provisional Patent Application having Ser. No. 63/122,367, filed on Dec. 7, 2020, the entire contents of which are incorporated by reference herein.

BACKGROUND

Field of the Invention

Embodiments of the present disclosure generally relate to the conversion of high value heat to useful work and power by using heat transfer systems and methods that include intermediate heat transfer fluids. More particularly, embodiments of the present disclosure relate to systems and methods for transferring and converting heat to a power cycle using a plurality of heat transfer fluids, loops and heat exchange devices to convert heat to useful work and/or power.

Description of the Related Art

Thermal power plants typically combust a fuel to produce the high value heat necessary to produce useful power (and potentially useful lower value heat) using conventional thermal power cycles. Some thermal power plants use external combustion, such as with a gas, fuel-oil or coal fired steam (e.g., Rankine or Kalina cycles) and transfer the heat of combustion to a power cycle fluid (e.g., water/steam) via some type of heat transfer device, such as boiler tubes, super-heater tubes, economizer tubes or other similar devices. In such external combustion power plants, the heat of combustion is directly transferred from a hot flue gas formed by the combustion process to the power cycle with no intermediate fluids or heat transfer devices.

Other thermal power plants have used internal combustion engines to generate power. Such engines include gas turbines, diesel engines, and Otto-cycle engines. These types of internal combustion engines do not require heat transfer from a source of heat to the motive fluid of the power cycle. No intermediate fluids or heat transfer devices are used with this class of thermal power generation. In fact, with such engines, the hot flue gas formed by the combustion process is the power cycle fluid.

Another group of thermal power plants use external combustion or a non-combustion high-value heat source without a direct transfer of heat to the power cycle fluid. Examples of such non-combustion heat sources are solar thermal (not to be confused with solar photovoltaic), nuclear, and geothermal sources. A power plant using such heat sources can be designed to directly transfer heat to the power cycle fluid (e.g., water/steam) from the heat source, but in practice another heat transfer fluid, such as a molten salt, liquid metal, oil, commercially available heat transfer fluid or inert gas, is used to absorb heat energy from the concentrated solar collector, nuclear reactor or geothermal source.

In these examples, thermal energy is transferred from the solar collector, nuclear reactor or geothermal source or from a heat transfer fluid or thermal storage fluid. In these systems, a large pressure difference typically exists between a heat transfer fluid and a power cycle fluid. This pressure differentials causes high stress levels that are imposed on the various components of the heat exchange devices, which may result in failure of the equipment and/or contamination of the various heat transfer fluids and power cycle fluids if there is a leak of some kind within the heat transfer device.

To further complicate matters, super critical power cycle fluids have been used to improve efficiencies in thermal power cycles, such as supercritical carbon dioxide ("$sCO_2$"). When super critical power cycle fluids are used, a heat exchanger, sometimes referred to as a recuperator, is needed to transfer heat from the hot low-pressure expander exhaust to a colder, high-pressure part of the system that follows the external cooler and supercritical pump. This recuperator is usually quite large to provide the acceptable cycle efficiency. The recuperator transfers heat from the last stage turbine exhaust at 60, 70, 80, 90, or 100 bar or more (heat that was not converted to shaft power by the expander or turbine stages) to the super critical fluid after it has been cooled by rejecting its excess heat to an external system and then pumped or compressed back to the high pressure needed at the turbine or expander inlet. Prior to the turbine inlet, the super critical fluid is heated to 350° C., 400° C., 450° C., 500° C., 550° C., 600° C., 650° C. or higher by transferring heat via the recuperator and from a thermal energy source, a heat transfer fluid and/or thermal storage fluid.

Several variations of a supercritical power cycle and in particular a supercritical carbon dioxide (sCO2) power cycles have been disclosed in the prior art. FIG. 1 depicts a prior art supercritical CO2 power cycle. FIG. 1 is a simple example in which a supercritical pump increases the pressure of a Cold Low-Pressure PCF Stream 1006 at about 80 bar, 20° C. and with a circulation rate of about 1000 T/h to about 450 bar and 53° C. to form a Cold High-Pressure PCF Stream 1000. The Cold High-Pressure PCF Stream 1000 then passes to a recuperator E-104 and exchanges heat with the Hot Exhaust PCF Stream 1004 and increases in temperature to about 332° C. to form a Hot High-Pressure PCF Stream 1001. The Hot High-Pressure PCF Stream 1001 then passes to a heat exchanger E-101 where it is heated by the PHTF to about 650° C. to form a Very Hot High-Pressure PCF Stream 1003. This Very Hot High-Pressure PCF Stream 1003 passes to the expansion turbine HP Expander thus generating power and exhausting to form the Hot Exhaust PCF Stream 1004 at about 80 bar and 427° C. The Hot Exhaust PCF Stream 1004 exchanges heat with the Cold High-Pressure PCF Stream 1000 to form the Cool Low-Pressure PCF Stream 1005 having a temperature of about 58° C. This Cool Low-Pressure PCF Stream 1005 passes to a cooler E-103 to reject heat to an external system and form the Cold Low-Pressure PCF Stream 1006 at about 20° C. Table 1 summarizes details of the process and energy streams of FIG. 1.

The overall cycle efficiency is estimated to be 48.22% with gross expander power generated of about 70 MW with external heat added via the PHTF of about 117 MW and losses of 12.5 MW for the pump, and 1.4 MW of other miscellaneous loads estimated to be about 2% of the expander gross power. About 123 MW of heat is recovered from the expander exhaust via the recuperator E-104 to heat the Cold High-Pressure PCF Stream 1000 and form the Hot High-Pressure PCF Stream 1001. About one half of the heat needed to heat the Cold High-Pressure PCF stream 1000 ahead of the HP Expander inlet is provided by the recuperator E-104.

FIG. 2 depicts another prior art supercritical CO2 power cycle. The system of FIG. 2 is a modification of FIG. 1 in which the single stage expander HP Expander of FIG. 1 is replaced by a two-stage expander, HP Expander and LP Expander, with reheat of the HP Expander Exhaust PCF stream 1004 of the high-pressure stage. As with FIG. 1 and Table 1, the Very Hot High-Pressure PCF stream 1003 is at 450 bar and 650° C. The reheat temperature is about 190 bar and 650° C.

The overall cycle efficiency increases to 50.23% with similar losses. About 121 MW of external heat is added to the Hot High-Pressure PCF Stream 1002 and the reheated HP Expander Exhaust PCF Stream 1004, and 159 MW of heat is recovered from the Hot Exhaust PCF Stream 1006 and transferred to heat the Cold High-Pressure PCF Stream 1000 to form the Hot High-Pressure PCF Stream 1001. As such, about 57% of the heat is recovered via the recuperator E-104 versus 43% from the external PHTF source.

FIG. 3 depicts another prior art supercritical CO2 power cycle. The system of FIG. 3 utilizes a reheat version of the systems depicted in FIGS. 1 and 2. This recuperated recompression $sCO_2$ will be referenced as the RR $sCO_2$ power cycle for the non-reheat version and the RH RR $sCO_2$ power cycle for the reheated version. The key modifications for either RR $sCO_2$ power cycle is that the recuperator is split into a high temperature part and a low temperature part with differing streams exchanging heat in each part. Substantially all the Hot Exhaust PCF Stream 1008 of FIG. 3 passes first through the hot side of the high temperature recuperator HT-A and then through the hot side of the low-temperature recuperator LT-A to remove heat from the Hot Exhaust PCF Stream 1008 to form the Cool Low-Pressure PCF Stream 1010. This Cool Low-Pressure PCF Stream 1010 is then split into at least a first portion and a second portion as depicted by TEE-100 in FIG. 3. The first portion, 1st Cool Low-Pressure PCF Stream 1011 is circulated to a tertiary cooler, condenser, or similar heat transfer device that transfers heat to an external system such as a cooling water system, air cooler or similar devices. This Cold Low-Pressure PCF Stream 1012 is circulated to a pressure increasing device such as a pump, compressor or supercritical pump or similar device (depicted as scPump in FIG. 3) to increase the pressure of stream 1012 to approximately the high pressure required by the power cycle and forming the Cold High-Pressure PCF Stream 1000. The Cold High-Pressure PCF Stream 1000 is then circulated to cold side of the low-temperature recuperator LT-A to heat this stream 1000 by exchanging heat with the Warm Exhaust PCF Stream 1009 and becoming the 1st Warm High-Pressure PCF Stream 1001.

The second portion of the Cool Low-Pressure PCF Stream 1010 is 2nd Cool Low-Pressure PCF Stream 1101. At least a portion of this 2nd Cool Low-Pressure PCF Stream 1101 is circulated to a pressure increasing device that can include a pump, supercritical pump, compressor or similar device (depicted as Hot scPump) to increase the pressure of this stream 1101 to approximately the same high pressure required by the power cycle and forming a 2nd Warm High-Pressure PCF Stream 1102.

The 1st Warm High-Pressure PCF Stream 1001 and the 2nd Warm High-Pressure PCF Stream 1102 are mixed to form a Mixed Warm High-Pressure PCF Stream 1104. At least a portion of this Mixed Warm High-Pressure PCF Stream 1104 is circulated to the cold side of the high-temperature recuperator HT-A to heat this stream 1104 to form a Hot High-Pressure PCF Stream 1003 and cool the Hot Exhaust PCF Stream 1008 on the hot side of this high-temperature recuperator HT-A to form a Warm Exhaust PCF Stream 1009. This Warm Exhaust PCF Stream 1009 is then circulated to the hot side of the low-temperature recuperator LT-A and is cooled by exchanging heat with the Cold High-Pressure PCF Stream 1000.

The Hot High-Pressure PCF Stream 1003 is then circulated to a heat exchange device E-101. This heat exchanger E-101 heats the Hot High-Pressure PCF Stream 1003 by exchanging heat directly or indirectly with a PHTF stream (e.g., MS1000, MS1100 and/or MS1001) to form the Very Hot High-Pressure PCF Stream 1005 that is circulated to the first of one or more expanders or turbine stages HP Expander thereby expanding the Very Hot High-Pressure PCF Stream 1005 to a lower pressure and generating power. Optionally, the expanded stream can be circulated to another heat exchange device to be heated further by the PHTF and then to additional expander stages (two stages are shown in FIG. 3) until the final exhaust pressure is reached thus generating added power and the Hot Exhaust PCF Stream 1008 is formed.

The flow circulation continues to add heat to the power generation system to generate shaft power from the one or more expander stages or to transfer heat to an external system or to raise the pressure of the at least two pumps, compressors, supercritical pumps or similar pressure raising devices and to recycle heat from the Hot Exhaust PCF Stream 1008 to the Cold High-Pressure PCF Stream 1000 and the Mixed Warm High-Pressure PCF Stream 1104.

For the system depicted in FIG. 3, the high pressure required by the power cycle is about 450 bar and the Very Hot High-Pressure PCF Stream 1005 at the high-pressure expander HP Expander is 650° C. The reheated PCF stream 1007 that enters the second expander stage LP Expander is also heated to 650° C. The exhaust pressure of the last stage expander is about 80 bar. The overall cycle efficiency is about 54.7% with similar losses as the previous prior art systems depicted in FIGS. 1 and 2. About 101 MW of external heat is added to the Hot High-Pressure PCF Stream 1003 and HP Expander Exhaust PCF Stream 1006 that is reheated to form the Reheated Expander PCF Stream 1007. About 155 MW of heat is recovered from the Hot Exhaust PCF Stream 1008 and transferred to the Cold High-Pressure PCF Stream 1000 and Mixed Warm High-Pressure PCF Stream 1104 to form the Hot High-Pressure PCF Stream 1003. About 61% of the heat is recovered via the HT-A and LT-A recuperators versus 39% from the external PHTF source.

The recuperators described above with reference to the systems of FIGS. 1-3 are limited by mechanical capabilities of the piping and other systems and by economics of the plant design. Anywhere from 50% to 90% of the heat added to the pumped or compressed super critical fluid stream is recycled heat from the expander exhaust. This makes the recuperator design challenging due to the high-pressure difference between the expander exhaust stream and the super critical fluid stream and because of the very high temperature differences between these streams, which can be 200° C., 300° C., 400° C., 500° C. or even 600° C. or more. Taken together, these operating requirements limit the types of heat exchanger designs that can be successfully used for this service, as such these heat exchangers are usually limited to small scale power plant applications.

One heat exchanger design that has been applied is the Printed Circuit Heat Exchanger (PCHE). This class of heat exchanger is well suited for high pressure and high temperature differences. PCHEs have microchannels to transfer heat from the hot expander exhaust stream to the cool high pressure pumped supercritical $CO_2$. Unfortunately, PCHEs are generally manufactured by a diffusion bonding process in which the entire exchanger element must be heated in a specialty oven to bond or weld the PCHE components into a pressure tight bundle. This manufacturing process restricts the available size of the PCHEs to serve a supercritical $CO_2$ power cycle of about 10 MW net power generation. While it is possible to install many of these PCHEs into a series/parallel heat exchanger network, the large temperature differences require large piping expansion loops that add to the cost and complexity of the power plant design.

SUMMARY OF THE INVENTION

Methods and systems for generating power using an intermediate heat transfer loop (IHTL) are provided. One method for generating power can include: a) providing two or more discreet heat transfer devices, arranged in series, and confined within one or more contained housings that are fluidly connected; b) circulating an intermediate heat transfer fluid (IHTF) stream through the housing and about the two or more discreet heat transfer devices; c) circulating at least a portion of a hot exhaust power cycle fluid (PCF) stream about the first of the two or more discreet heat transfer devices to cool the hot exhaust power cycle fluid stream becoming a cool low-pressure power cycle fluid stream and to heat the intermediate heat transfer fluid stream; d) circulating at least a portion of the cool low-pressure power cycle fluid stream to a tertiary heat transfer device to reject residual heat from the cool low-pressure power cycle fluid stream to an external system to form a cold low-pressure power cycle fluid stream; e) pumping or compressing at least a portion of the cold low-pressure power cycle fluid stream to form a cold high-pressure power cycle fluid stream; f) circulating at least a portion of the cold high-pressure power cycle fluid stream about the second of the two or more discreet heat transfer devices to heat the cold high-pressure power cycle fluid stream and to cool the intermediate heat transfer fluid stream to from a hot high-pressure power cycle fluid stream; g) heating a primary heat transfer fluid (PHTF) using an external heat source to provide a heated primary heat transfer fluid; h) circulating at least a portion of the heated primary heat transfer fluid to a heat transfer device to further heat the hot high-pressure power cycle fluid stream to form a very hot high-pressure power cycle fluid stream; i) circulating the very-hot high-pressure power cycle fluid stream to an expansion turbine device to form the said hot exhaust power cycle fluid stream and generate power. The temperature of the IHTF can be increased by 100° C., 150° C., 200° C., 250° C., 300° C., 350° C., 400° C., 450° C., 500° C., 550° C. or more by exchanging heat with the expander exhaust stream, either directly or indirectly. The terms heat exchanger, heat exchange device and heat transfer device are used interchangeably herein, and all refer to a device for transferring heat from one fluid to another without allowing them to mix.

The PCF can be any working fluid at or above its critical temperature and/or pressure within the power cycle. The PCF is preferably supercritical carbon dioxide. The IHTF can be or can include dry air, humid air, nitrogen, argon, any other constituent of air, water, steam, a hydrocarbon fluid in any state, a molten salt, a liquid metal or another heat transfer fluid known to those skilled in the art. The are no restrictions to the type of IHTF that can be used. The selection of a suitable IHTF can be based on an economic evaluation of the size and cost of the required equipment for a desired power plant size and capability. The PHTF can be a molten salt, heat transfer oil, hydrogen, an inert gas, air, any constituent of air, liquid metal or a hydrocarbon fluid.

BRIEF DESCRIPTION OF THE DRAWINGS

So that the manner in which the above recited features of the present invention can be understood in detail, a more particular description of the invention, briefly summarized above, can be had by reference to embodiments, some of which are illustrated in the appended drawings. It is to be noted, however, that the appended drawings illustrate only typical embodiments of this invention and are therefore not to be considered limiting of its scope, for the invention can admit to other equally effective embodiments.

DETAILED DESCRIPTION

Figure 1:
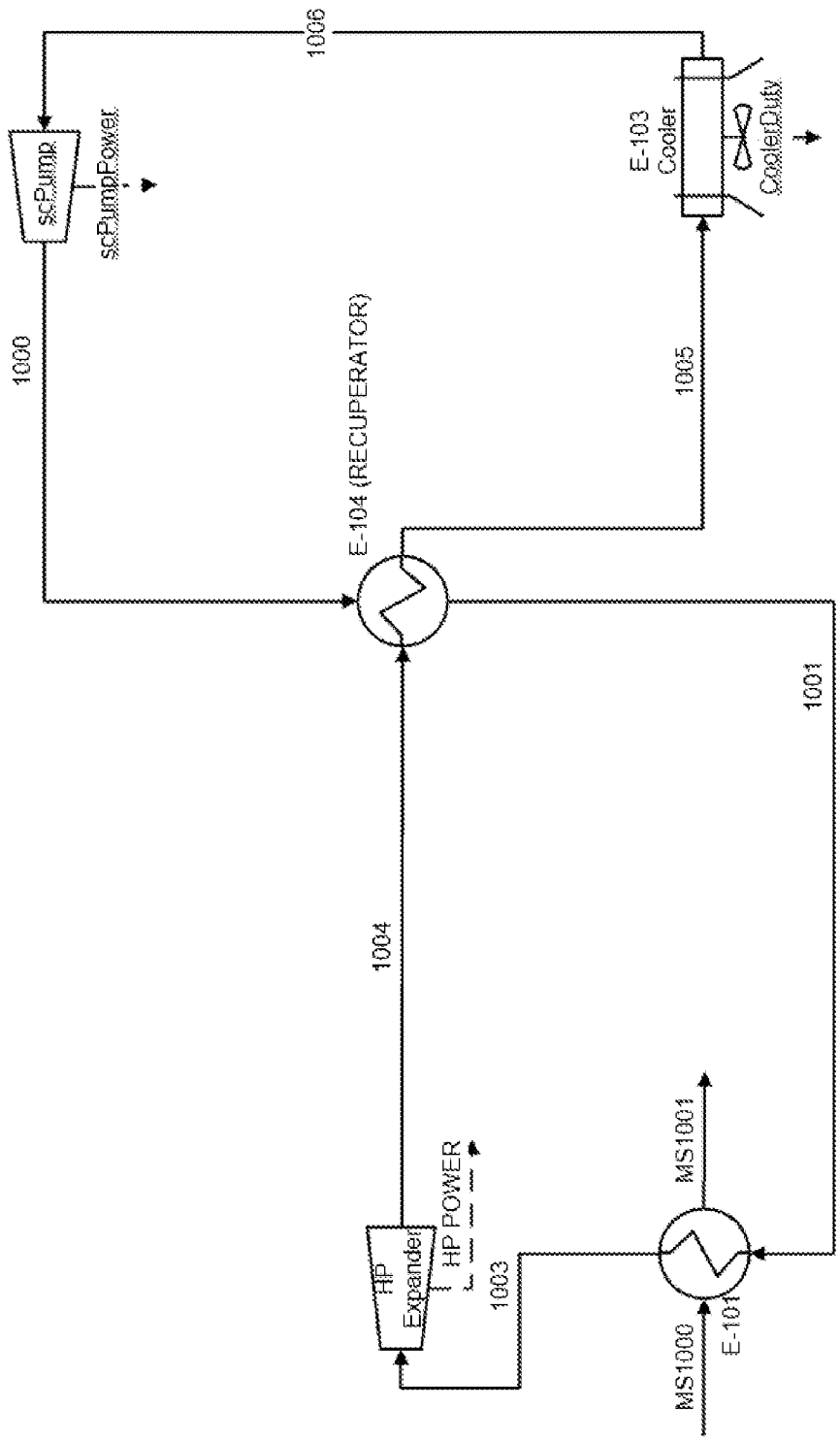
FIG. 1 depicts a prior art supercritical CO2 power cycle.
Figure 4:
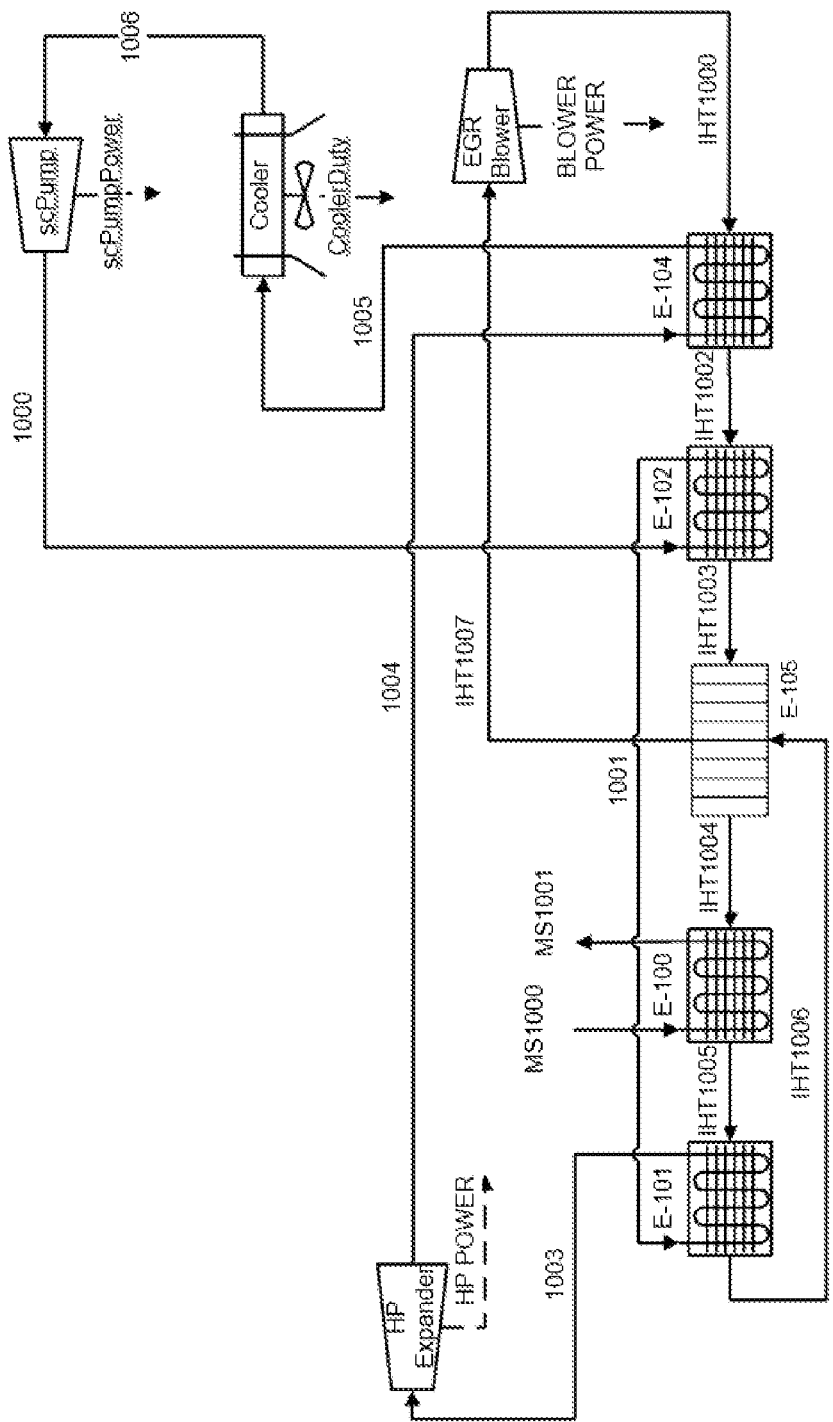
FIG. 4 depicts a supercritical CO2 power cycle using a single intermediate heat transfer fluid (IHTF) to transfer heat among the supercritical power cycle fluid (PCF) streams and from a primary heat transfer fluid (PHTF) to the supercritical power cycle fluid stream, according to one or more embodiments described herein.

FIG. 4 depicts a supercritical CO2 power cycle system (System 001) using an intermediate heat transfer fluid (IHTF) to transfer heat among the supercritical power cycle fluid (PCF) streams and from a primary heat transfer fluid (PHTF) to a supercritical power cycle fluid (PCF) stream, according to one or more embodiments. System 001 is an improvement of the prior art system depicted in FIG. 1. In System 001, two or more discreet heat transfer devices are provided, arranged in series, and confined within one or more contained housings that can be fluidly connected. An IHTF stream, for example IHTF stream IHT1000 is circulated through the one or more fluidly connected housings and about the two or more discreet heat transfer devices, for example E-104 and E-102. At least a portion, a majority, substantially all or all of a Hot Exhaust PCF Stream 1004 is circulated about the first of the two or more discreet heat transfer devices (e.g., E-104) to cool the Hot Exhaust PCF Stream and heat the IHTF stream (e.g., IHT1000 to IHT1002) to form a Cool Low-Pressure PCF Stream 1005. The Cool Low-Pressure PCF Stream or at least a portion of it, is circulated to a tertiary heat transfer device such as a cooler, condenser or similar device to reject residual heat from the Cool Low-Pressure PCF Stream to an external system like a cooling tower, cooling water system or air-cooled cooler, to form a Cold Low-Pressure PCF Stream 1006.

The heat transfer device can be or can include finned tube coils like those found in a heat recovery steam generator for a gas turbine combined cycle plant. This can be most appropriate with an IHTF selection of air or similar gases circulating on the finned exterior of the coils and with the PCF circulating within the tube coils. On the other hand, if the IHTF is a liquid metal, such as sodium, potassium or a sodium-potassium alloy that have much higher thermal conductivities that other type of IHTF and may not require finned tubes, then a different arrangement such as tubes without external fins, tubes with internal devices like turbulators or circulating the IHTF and PCF on opposite sides of the heat transfer device, can be the better selection. Many designs of heat transfer devices known to those skilled in the art can be appropriate with the present disclosure. These heat transfer devices can include shells, tubes, coils, plates, fins, pipes within other pipes, baffles, corrugations, non-rotating and rotating parts. Embodiments of the present disclosure facilitate the realization of a recuperator system that can be applied to large scale power plants.

The Cold Low-Pressure PCF Stream, or at least a portion of it, is circulated to a pressure raising device such as a pump, compressor, supercritical pump or a similar device (e.g., scPump). The pressure raising device can include a variable speed and/or variable blade or vane device and/or a variable flow resistance device to allow adjustment of the flow rate through the device. The Cold Low-Pressure PCF Stream is thus pumped or compressed to form a Cold High-Pressure PCF Stream 1000. This Cold High-Pressure PCF Stream, or at least a portion of it is circulated about the second of the two or more discreet heat transfer devices to heat the Cold High-Pressure PCF Stream and to cool the IHTF stream (e.g., IHT1002 to IHT1003) to form a Hot High-Pressure PCF Stream 1001. This cooled IHTF stream IHT1003 is then circulated to a feed-effluent heat exchanger E-105 to exchange heat with another IHTF stream IHT1006. This feed-effluent exchanger, for example as shown in FIG. 4, heats IHT1003 to become IHT1004 and cools IHT1006 to become IHT1007. Such a feed-effluent exchanger can be a plate-and-frame type heat exchanger that is well suited to exchanging heat between similar fluids at the relatively low pressures generally expected for the IHTF streams.

A PHTF stream can be heated using an external heat source, such as a solar collector, nuclear reactor, combustion process or thermal reaction process or other high value heat sources, to provide a heated PHTF stream. The heated IHTF stream leaving the feed-effluent exchanger, or at least a portion of it, is now further heated by circulating it about the first of two or more discreet heat transfer devices, arranged in series and confined within at least one contained housing that can be fluidly connected, by at least a portion of the heated PHTF that is also circulated to the first of the two or more discreet heat transfer devices (e.g., E-100).

The now very hot IHTF stream IHT1005 is circulated to second of the two or more discreet heat transfer devices to further heat the Hot High-Pressure PCF Stream to form a Very Hot High-Pressure PCF Stream 1003. This Very Hot High-Pressure PCF Stream is now circulated to an expansion turbine device to form the said Hot Exhaust PCF Stream and to generate power.

Finally, the IHTF stream IHT1006 leaving the second of the two or more discreet heat transfer devices is circulated to the feed-effluent exchanger to heat the cooled IHTF stream mentioned earlier (e.g., IHT1003) and to produce a cooler IHTF stream IHT1007 that is then circulated to a blower, compressor, pump, other pressure raising device to maintain overall circulation of the IHTF through its circuit.

As an alternative, this IHTF circuit can be arranged with hot and cold vertical legs or other means to promote natural circulation of the IHTF through the circuit. Also, the blower can be located anywhere with the IHTF loop. It is shown in FIG. 4 in this location as the blower can require less energy (power) to circulate the IHTF streams due to the lower temperature at this location.

The blower, compressor, pump or other pressure raising device used to maintain IHTF circulation can include a variable speed device, variable vane device and/or a variable flow restriction device to allow the IHTF circulation rate or flow rate to be adjusted either manually or by the action of a digital or analog control device or system.

Table 4 details certain stream conditions, properties and energy streams for System 001. Table 4 depicts only one of the many potential applications of this system and method based on a power cycle that operates between about 80 bar to about 450 bar with low temperatures of the cycle of about 20° C. to high temperatures of about 650° C.

Those skilled in the art understand that these are exemplary and that low system pressures can range from 60 bar, 70 bar, 80 bar, 90 bar or 100 bar or more with supercritical $CO_2$ as the working fluid. The high system pressures can range from 150 bar, 200 bar, 250 bar, 300 bar, 350 bar, 400 bar, to 450 bar or higher. Selection of these high and low system pressures can be based on economics selections of equipment and specific requirements for a power plant design. Further, low system temperatures can range from lower than 0° C., to 0° C., 20° C., 30° C., 40° C., 50° C. or higher mostly based on local ambient and external cooling capabilities. Further, in some embodiments a tertiary heat transfer device can include a chilling system that can reduce low system temperatures well below 0° C. Such chilling systems can include a vaporization system for hydrocarbons like liquified natural gas. The high system temperatures can range from 200° C., 300° C., 400° C., 450° C., 500° C., 550° C., 600° C. or 650° C. or higher. As with the high-pressure selection, the high-end temperatures can be based on economic selections and specific requirements for a power plant design. Similar pressure and temperature ranges can be considered for all systems included in this disclosure.

Temperatures of the IHTF streams and other PCF streams can range between the high and low temperatures of the power cycle design. The pressures of the other PCF streams will also range between the low and high system pressures. The pressure of the IHTF streams will generally be low relative to the PCF streams. In some embodiments, the IHTF streams can be below, near or above ambient pressures. In some embodiments, the IHTF streams can be higher at 2 bar, 5 bar, 10 bar or higher pressures.

Figure 5:
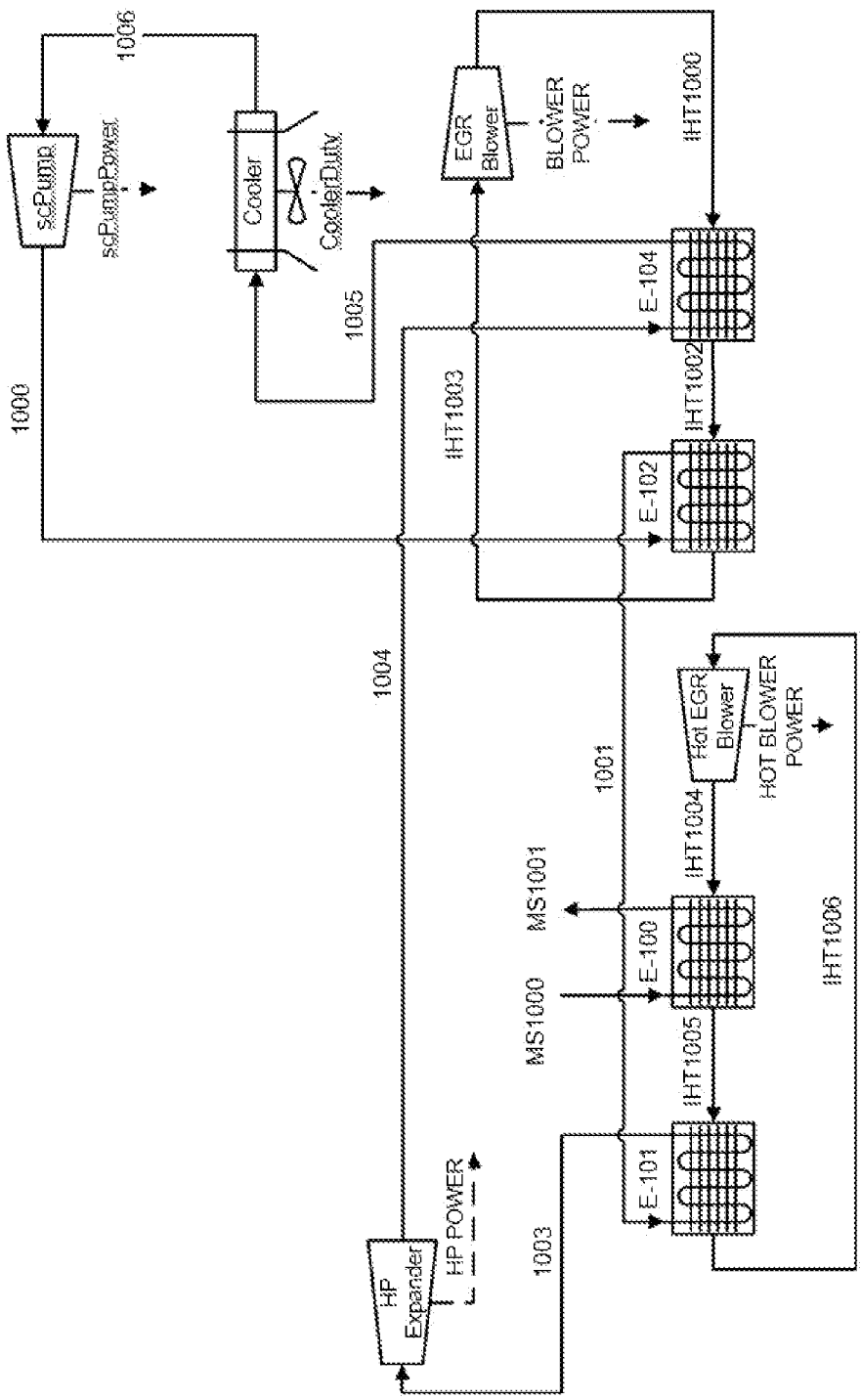
FIG. 5 depicts an alternative supercritical CO2 power cycle using two separate intermediate heat transfer fluid loops to either transfer heat from the primary heat transfer fluid to a supercritical power cycle fluid stream and/or to transfer heat among the supercritical power cycle fluid streams, according to one or more embodiments described herein.

FIG. 5 depicts an alternative supercritical CO2 power cycle system (System 002) using two separate intermediate heat transfer fluid loops to either transfer heat from the primary heat transfer fluid to the supercritical power cycle fluid stream or to transfer heat among the supercritical power cycle fluid streams, according to one or more embodiments. System 002 is a modification of System 001 in which the IHTF circulation is changed from one circulation loop in System 001 with a feed-effluent heat exchanger to at least two IHTF circulation loops that are largely independent. The two loops can be fluidly connected to maintain pressure balance, heat balance or similar requirements but such fluid connection does not circulate a portion of the IHTF stream flow rate between loops that is greater than 50%, 40%, 30%, 20%, 10%, 5% or 1% of the nominal flow rate of the IHTF streams.

In System 002, two or more discreet heat transfer devices are provided, arranged in series, and confined within one or more contained housings that can be fluidly connected as part of a first of the two or more IHTF circulation loops. An IHTF stream, for example IHTF stream IHT1000 of FIG. 5, is circulated through the one or more fluidly connected housings and about the two or more discreet heat transfer devices (e.g., E-104 and E-102). At least a portion, a majority, substantially all or all of a Hot Exhaust PCF Stream 1004, is circulated about the first of the two or more discreet heat transfer devices (e.g., E-104) to cool the Hot Exhaust PCF Stream to form the Cool Low-Pressure PCF Stream 1005 and to heat the IHTF stream (e.g., IHT1000 to IHT1002). The Cool Low-Pressure PCF Stream, or at least a portion of it, is circulated to a tertiary heat transfer device such as a cooler, condenser or similar device to reject residual heat from the Cool Low-Pressure PCF Stream to an external system like a cooling tower, cooling water system or air-cooled cooler, to form a Cold Low-Pressure PCF Stream 1006.

The Cold Low-Pressure PCF Stream, or at least a portion of it, is pumped or compressed to form a Cold High-Pressure PCF Stream 1000. This Cold High-Pressure PCF Stream, or at least a portion of it is circulated about the second of the two or more discreet heat transfer devices to heat the Cold High-Pressure PCF Stream to form a Hot High-Pressure PCF Stream 1001 and cool the IHTF stream (e.g., IHT1002 to IHT1003). This cooled IHTF stream IHT1003 is to a circulated to a blower, compressor, pump, other pressure raising device to maintain overall circulation of the IHTF through this first of two or more IHTF circulation loops. This first IHTF circulation loop and associated heat exchange devices serve the function of the recuperators in the Prior Art Examples 1 and 2 and can be referred to as the Recuperator IHTF circulation loop.

A PHTF stream can be heated using an external heat source, such as a solar collector, nuclear reactor, combustion process, thermal reaction process or other high value heat sources, to provide a heated PHTF stream. IHTF stream IHT1004 is now heated by circulating it about the first of two or more discreet heat transfer devices, arranged in series and confined within at least one contained housing that can be fluidly connected, by at least a portion of the heated PHTF that is also circulated to the first of the two or more discreet heat transfer devices (e.g., E-100.

This very hot IHTF stream IHT1005 is circulated to second of the two or more discreet heat transfer devices to further heat the Hot High-Pressure PCF Stream to form a Very Hot High-Pressure PCF Stream 1003. This Very Hot High-Pressure PCF Stream is now circulated to an expansion turbine device to form the said Hot Exhaust PCF Stream 1004 and to generate power.

The IHTF stream IHT1006 leaving the second of the two or more discreet heat transfer devices is circulated to a blower, compressor, pump, other pressure raising device to maintain overall circulation of this second of two or more IHTF circulation loops.

As an alternative, this IHTF circuit can be arranged with hot and cold vertical legs or other means to promote natural circulation of the IHTF through the loop. As described before, other locations of the blower within the IHTF loop are also feasible.

As with System 001, suitable devices can be provided to adjust the flow rates of one or both IHTF circulation loops and the PCF streams.

Table 5 details certain stream conditions, properties and energy streams for System 002. Table 5 depicts only one of the many potential applications of this system and method based on a power cycle that operates between about 80 bar to about 450 bar with low temperatures of the cycle of about 20° C. to high temperatures of about 650° C. A similar range of operating pressures and temperatures described for System 001 are also suitable with System 002.

Figure 6:
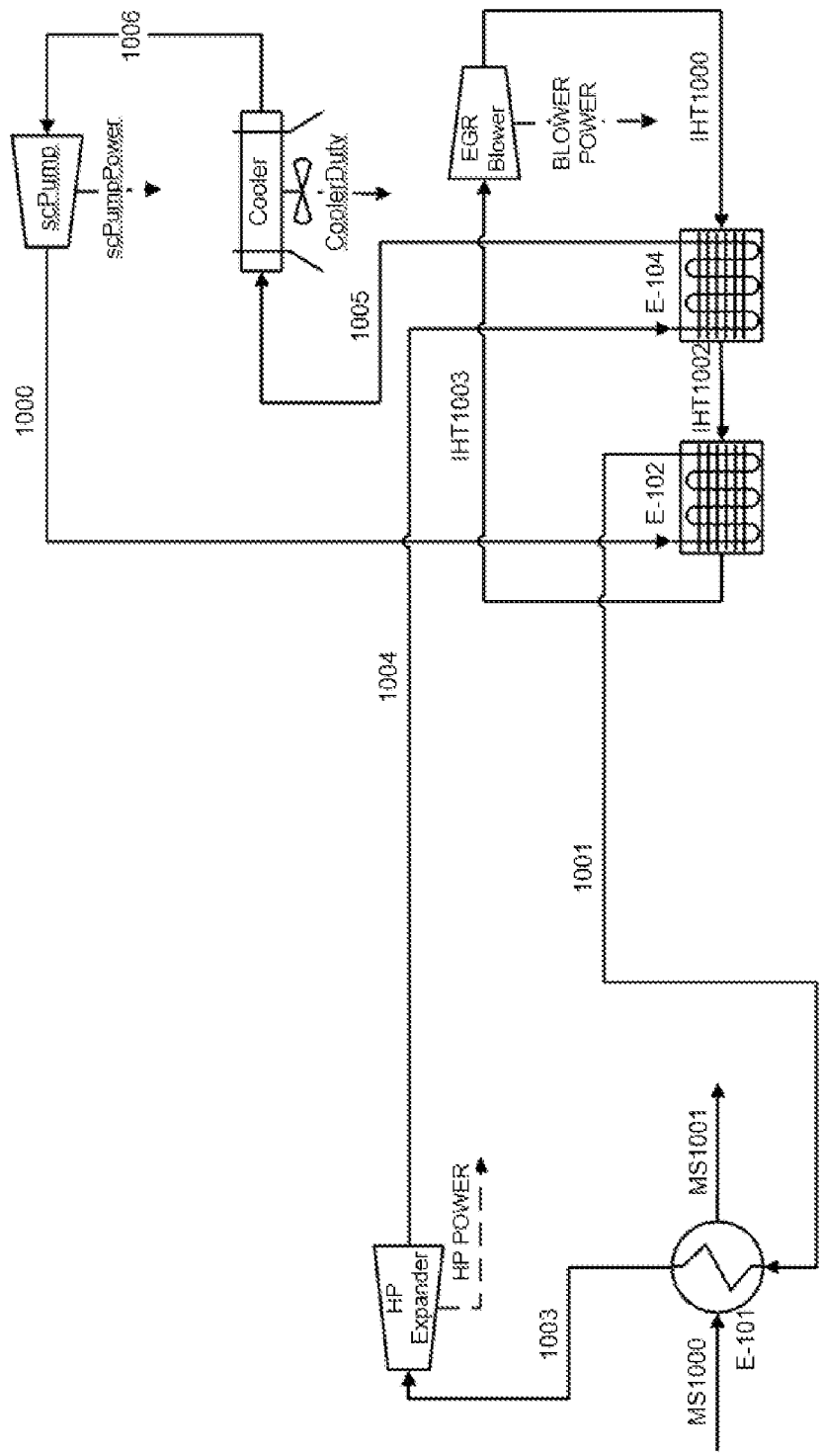
FIG. 6 depicts another alternative supercritical CO2 power cycle in which only one intermediate heat transfer loop is used to transfer heat among the supercritical power cycle fluid streams, according to one or more embodiments described herein.

FIG. 6 depicts another alternative supercritical CO2 power cycle system (System 003) in which only one intermediate heat transfer loop is used to transfer heat among the supercritical power cycle fluid streams, according to one or more embodiments. System 003 is a modification of System 002 that utilizes a single IHTF circulation loop. The first of the IHTF circulation loops in System 002, the Recuperator IHTF circulation loop, is unchanged and serves to transfer heat from at least a part, substantially all or all of the Hot Exhaust PCF Stream 1004 to the Cold High-Pressure PCF Stream 1000 by first transferring that heat to an IHTF stream and then from that IHTF stream to the Cold High-Pressure PCF Stream to form the Hot High-Pressure PCF Stream 1001. The Hot High-Pressure PCF Stream is circulated to at least one discreet heat transfer device and is heated by the PHTF stream of System 002 directly and without transferring this heat via an IHTF stream. Other systems, methods and devices of System 002 are replicated with System 003.

Table 6 details certain stream conditions, properties and energy streams for System 003. Table 6 depicts only one of the many potential applications of this system and method based on a power cycle that operates between about 80 bar to about 450 bar with low temperatures of the cycle of about 20° C. to high temperatures of about 650° C. A similar range of operating pressures and temperatures described for System 001 are also suitable with System 003.

Figure 7:
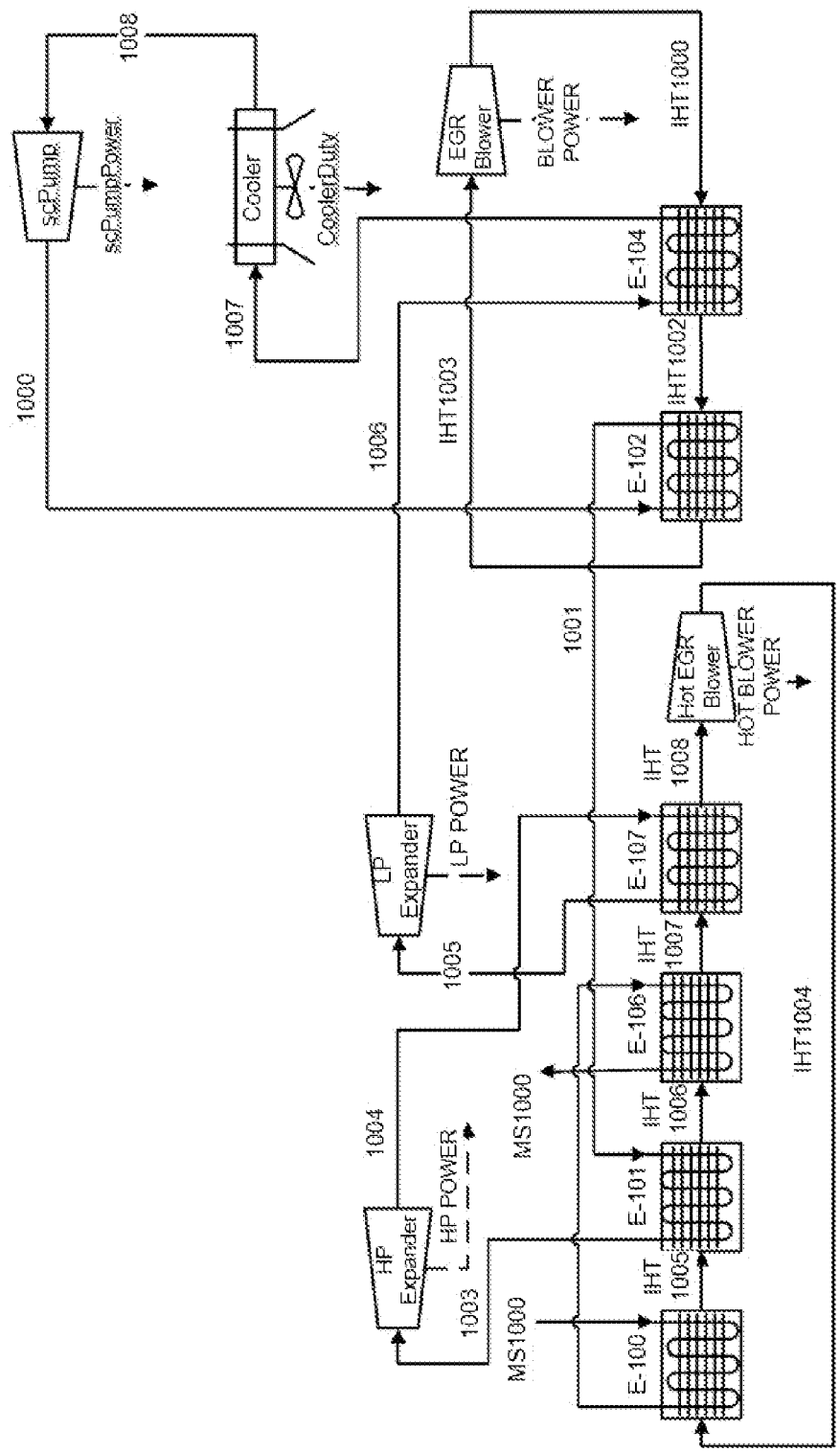
FIG. 7 depicts another alternative supercritical CO2 power cycle in which the expander device is modified to allow the supercritical power cycle fluid stream to be partially expanded and then reheated by the primary heat transfer fluid via an intermediate heat transfer fluid prior to further expansion, according to one or more embodiments described herein.

FIG. 7 depicts another alternative supercritical CO2 power cycle system (System 004) in which the expander device is modified to allow the supercritical power cycle fluid stream to be partially expanded and then reheated by the primary heat transfer fluid via an intermediate heat transfer fluid prior to further expansion, according to one or more embodiments. System 004 is another modification of System 002 that replaces the single stage expander with a multi-stage expander having two or more stages (two stages are shown). The number of expansion and reheating stages can be estimated by a cost benefit analysis of the incremental capital investment versus the incremental return on that investment. As with System 002, two or more IHTF circulation loops are provided. The first of these circulation loops serves as the Recuperator IHTF circulation loop like Systems 002 and 003.

Like System 002, a second of the two or more IHTF circulation loops can be provided to transfer heat from the PHTF to the high-pressure PCF streams. System 004 includes at least two expander stages and each subsequent stage includes a system to reheat the PCF exhaust of the prior stage prior to continued expansion as previously described for the prior art system of FIG. 2. Contrary to the prior art system of FIG. 2 and like System 002, a PHTF stream and a IHTF stream are independently circulated to a first discreet heat exchange device to heat the IHTF stream. This IHTF stream and the Hot High-Pressure PCF Stream 1001 are independently circulated to a second discreet heat exchange device to form the Very Hot High-Pressure PCF Stream that can enter the high-pressure expander stage. The first exhaust from this high-pressure stage, the HP Expander Exhaust PCF Stream 1004 and the IHTF stream that can have been reheated by another PHTF stream in third discreet heat exchange device are independently circulated to a fourth discreet heat exchange device to reheat the HP Expander Exhaust PCF Stream prior to circulating to a second expander stage. This system and method can be replicated for additional expander stages until the last expander that exhausts the Hot Exhaust PCF Stream 1006.

Table 7 details certain stream conditions, properties and energy streams for System 004. Table 7 depicts only one of the many potential applications of this system and method based on a power cycle that operates between about 80 bar to about 450 bar with low temperatures of the cycle of about 20° C. to high temperatures of about 650° C. A similar range of operating pressures and temperatures described for System 001 are also suitable with System 004.

Figure 8:
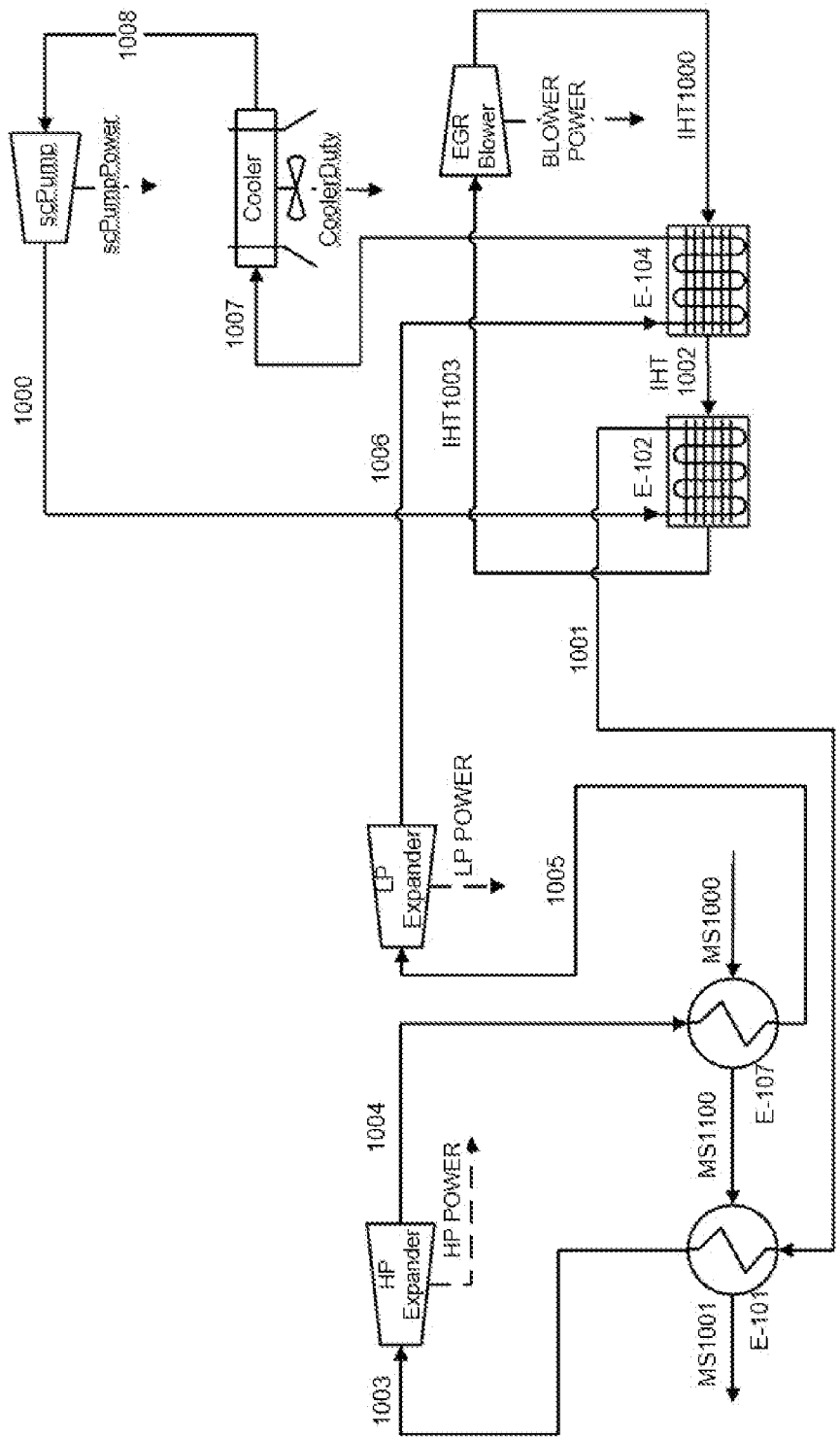
FIG. 8 depicts another alternative supercritical CO2 power cycle in which only one intermediate heat transfer loop is used to transfer heat among the supercritical power cycle fluid streams.

FIG. 8 depicts another alternative supercritical CO2 power cycle system (System 005) in which only one intermediate heat transfer loop is used to transfer heat among the supercritical power cycle fluid streams. System 005 eliminates the second of two or more IHTF circulation loops of System 002 and 004. The first of the IHTF circulation loops in Systems 002 and 004 (i.e., the Recuperator IHTF circulation loop) is unchanged and still serves to transfer heat from at least a part, substantially all or all of the Hot Exhaust PCF Stream 1006, to the Cold High-Pressure PCF Stream 1000 by first transferring heat to an IHTF stream and then from that IHTF stream to the Cold High-Pressure PCF Stream to form the Hot High-Pressure PCF Stream 1001. Instead, the Hot High-Pressure PCF Stream is circulated to at least one discreet heat transfer device and is heated by the PHTF stream directly and without transferring this heat via an IHTF stream. Similarly, the HP Expander Exhaust PCF Stream 1004 is heated by the PHTF stream directly and without transferring this heat via an IHTF stream. A similar system and method can be applied to reheat other expander exhaust streams if more than two expander stages are used. Other systems, methods and devices of System 004 are replicated with System 005.

Table 8 details certain stream conditions, properties and energy streams for System 005. Table 8 depicts only one of the many potential applications of this system and method based on a power cycle that operates between about 80 bar to about 450 bar with low temperatures of the cycle of about 20° C. to high temperatures of about 650° C. A similar range of operating pressures and temperatures described for System 001 are also suitable with System 005.

Regarding FIG. 6 (System 003) and FIG. 8 (System 005), an alternative modification of System 003 or System 005 can include one intermediate heat transfer loop to only transfer heat from a primary heat transfer fluid to the supercritical power cycle fluid stream.

Figure 2:
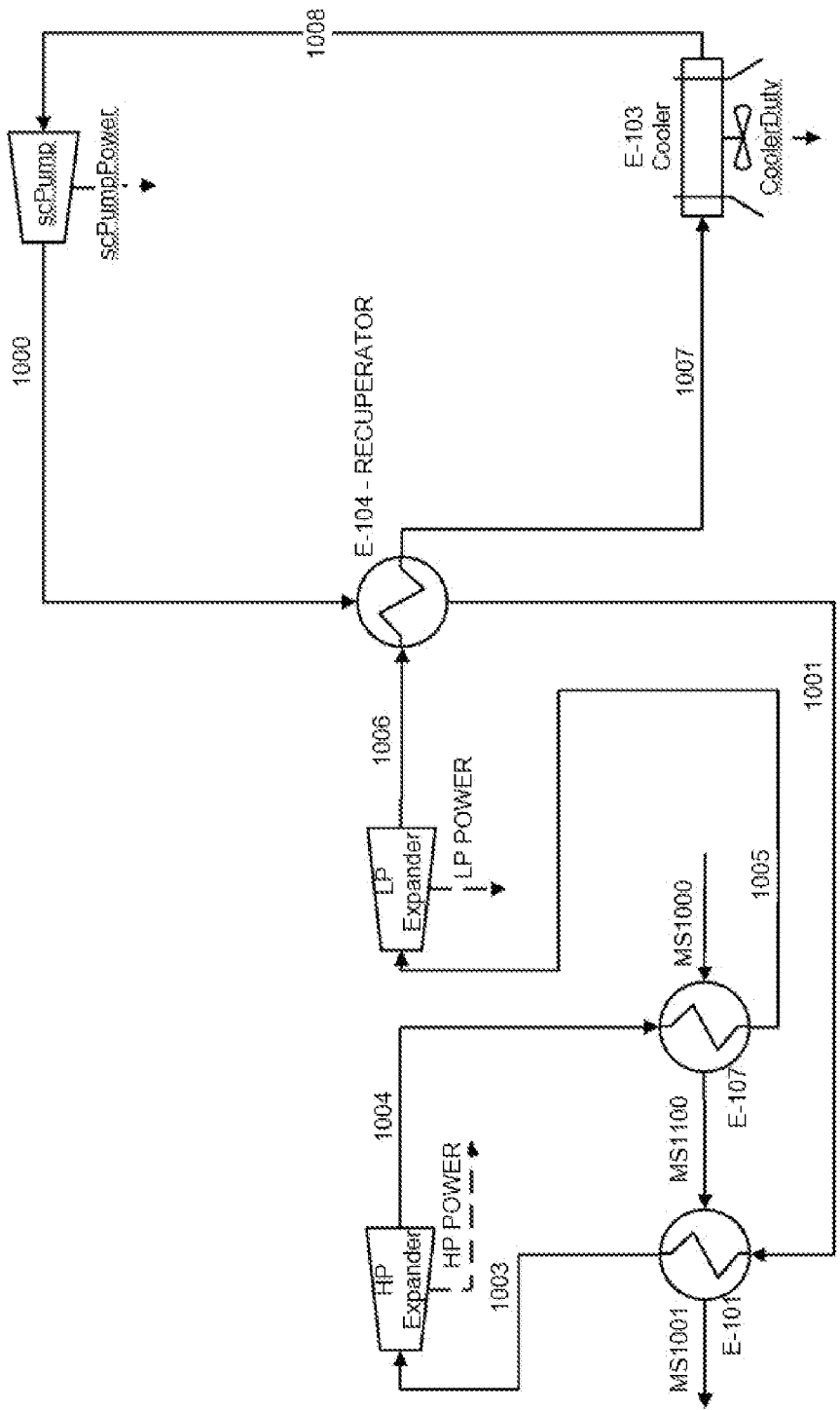
FIG. 2 depicts a prior art supercritical CO2 power cycle with reheat.
Figure 9A:
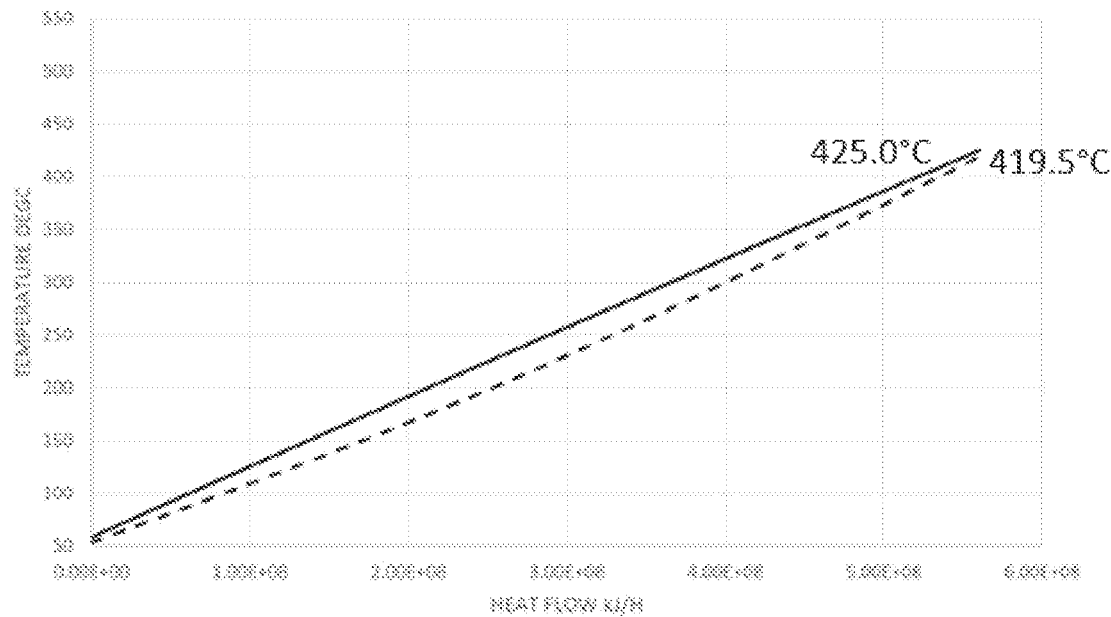
FIGS. 9A-C shows the temperature versus heat flow for the recuperators used in System 005 and the Prior Art system depicted in FIG. 2.
Figure 9B:
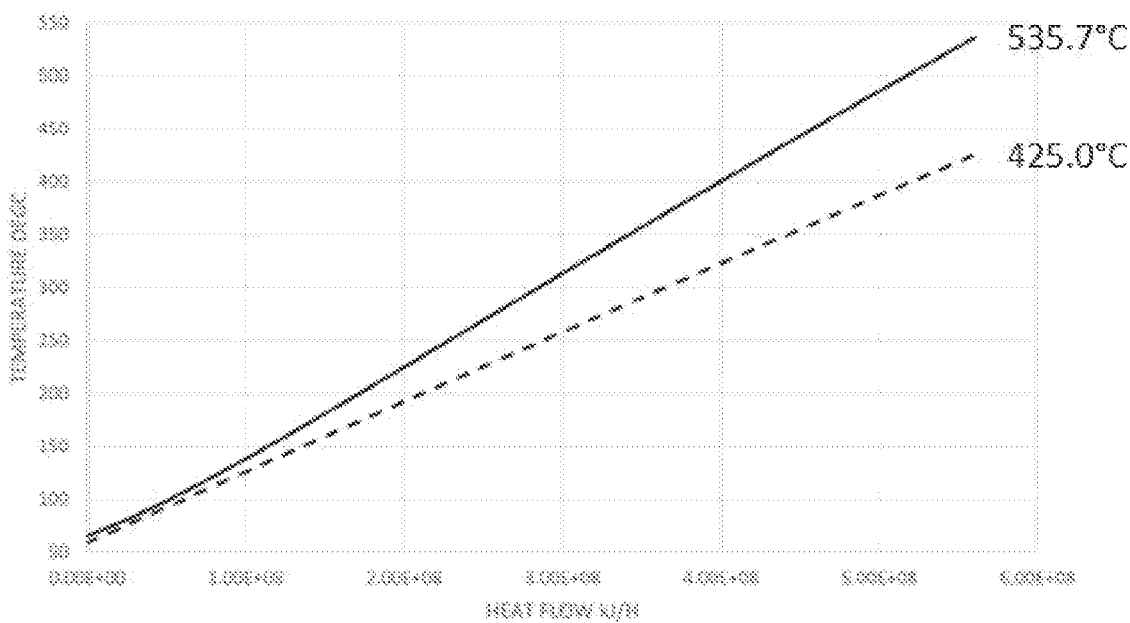
Figure 9C:
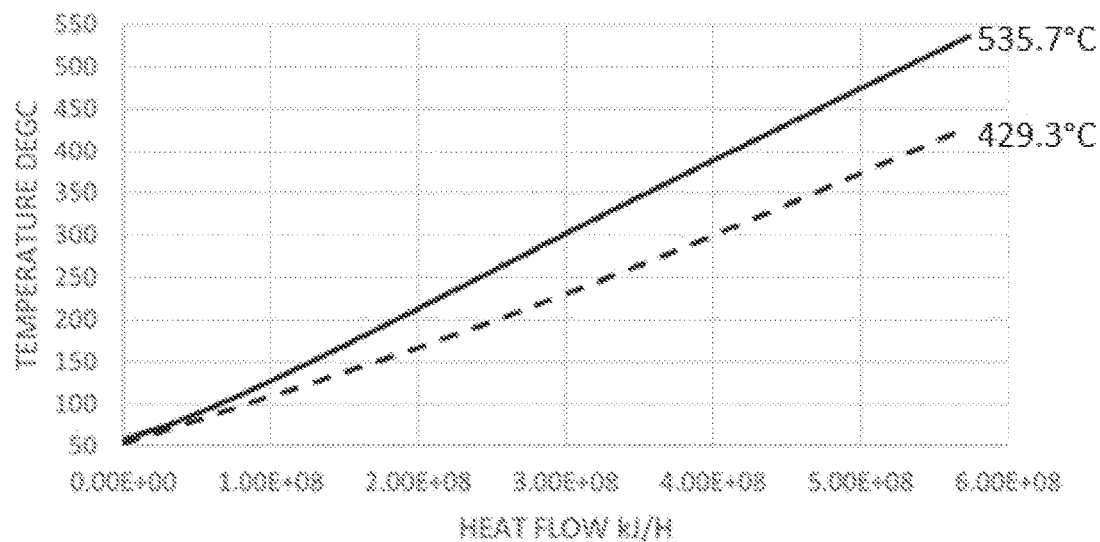
Figure 10A:
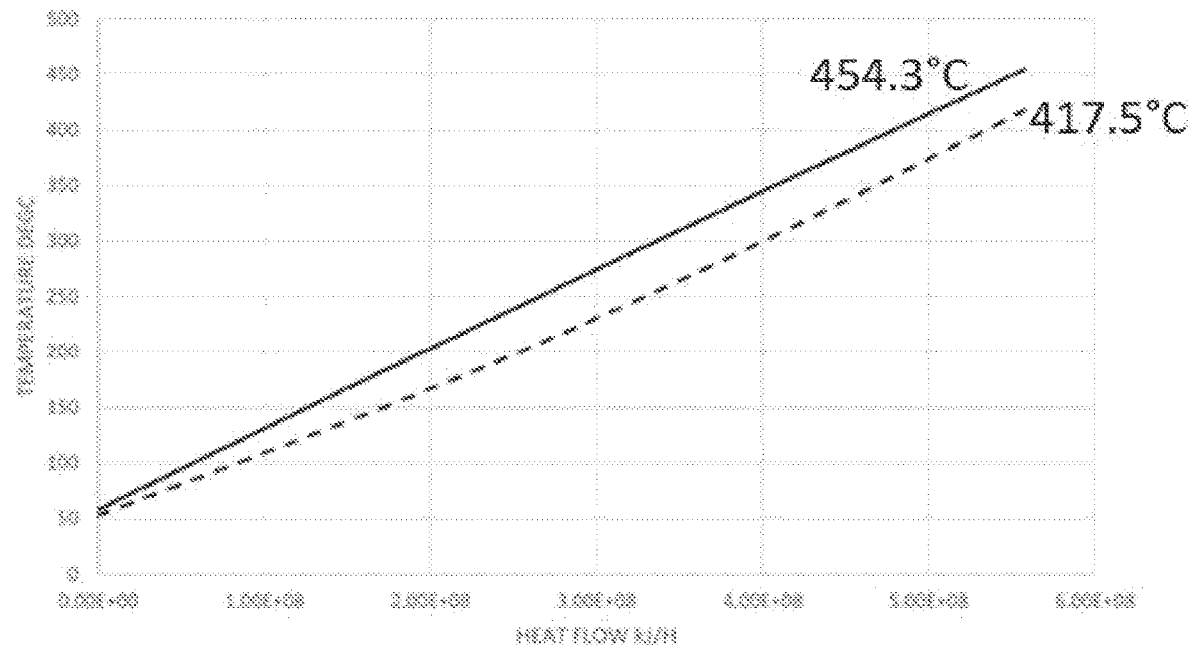
FIGS. 10A-F show the temperature versus heat flow for the recuperators of System 005 with changing ratios of intermediate heat transfer fluid flow rate versus the flow rate of the supercritical power cycle fluid.
Figure 10B:
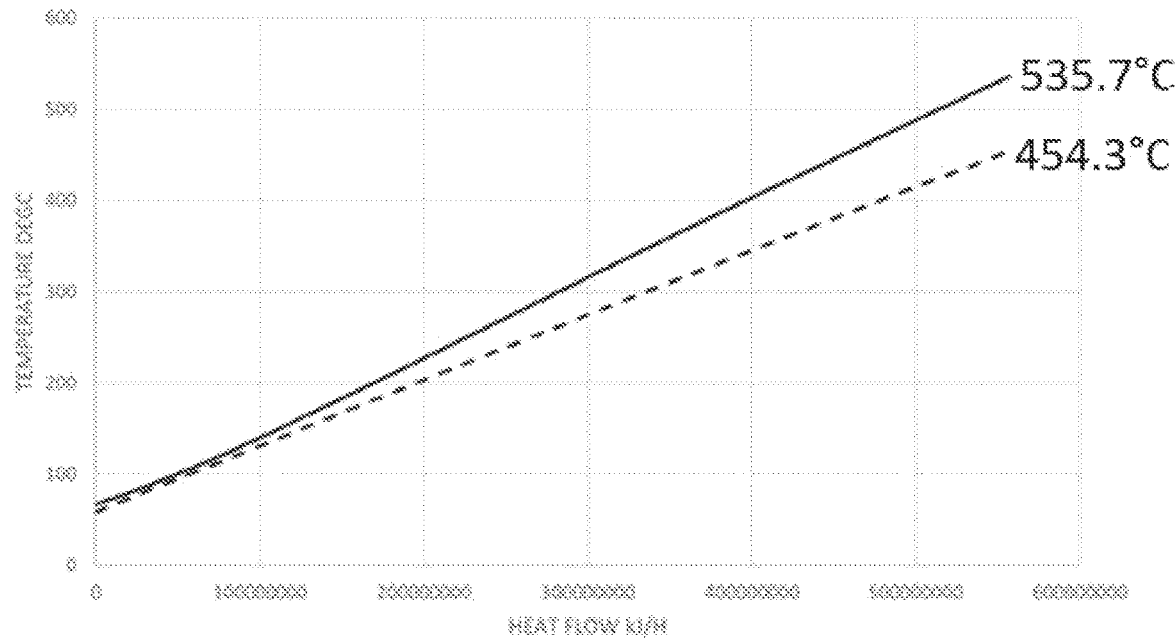
Figure 10C:
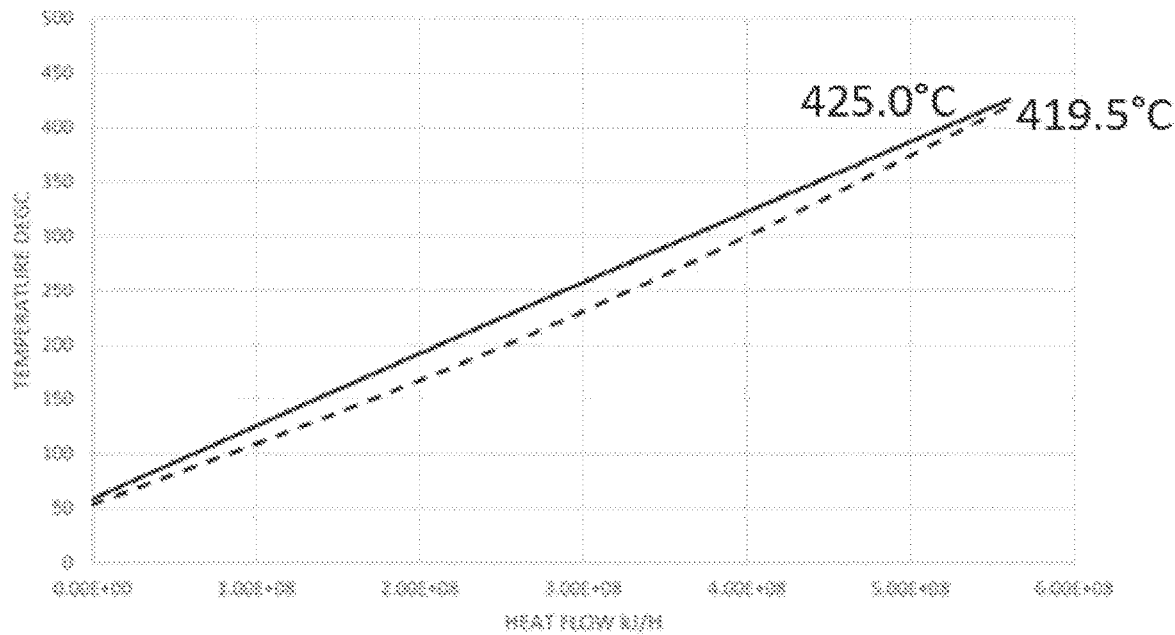
Figure 10D:
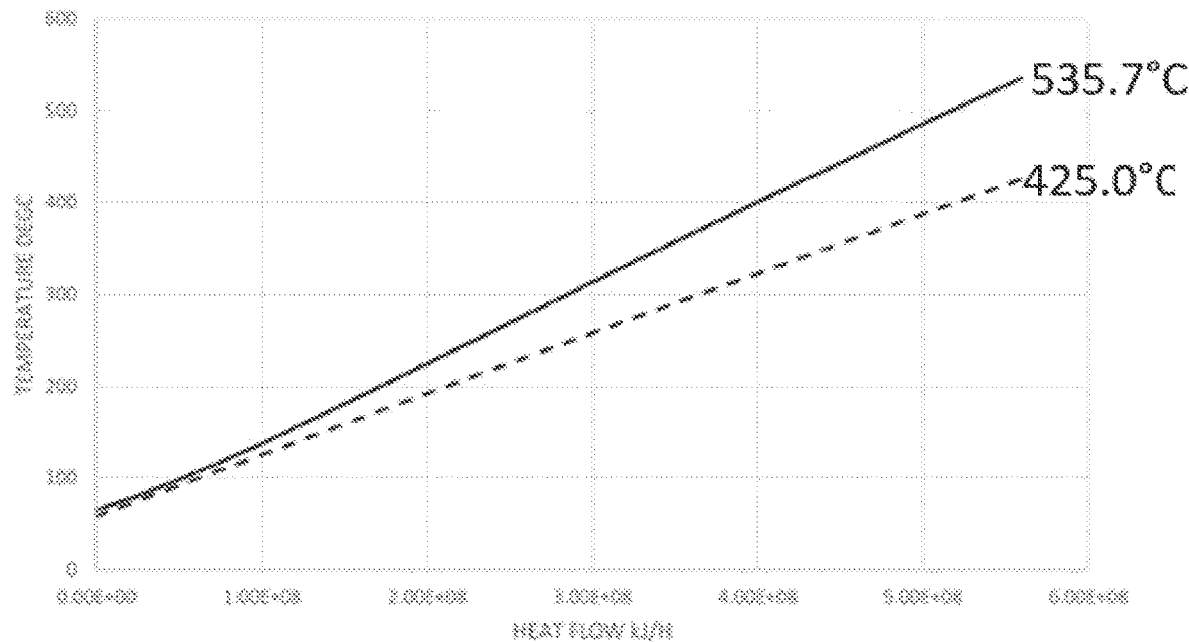
Figure 10E:
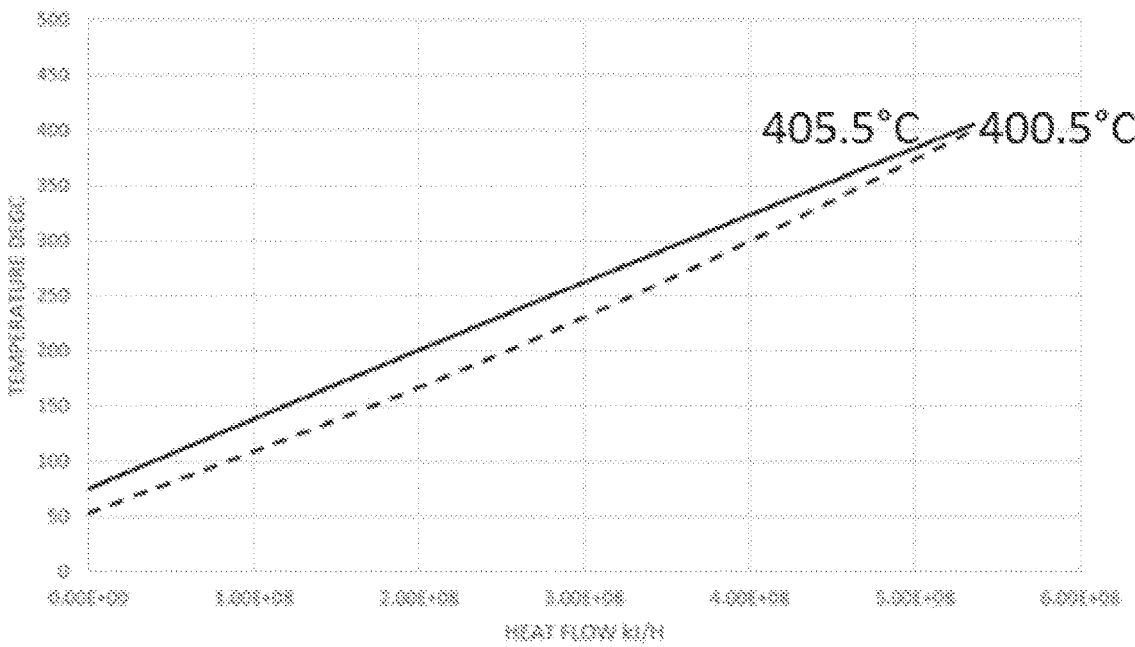
Figure 10F:
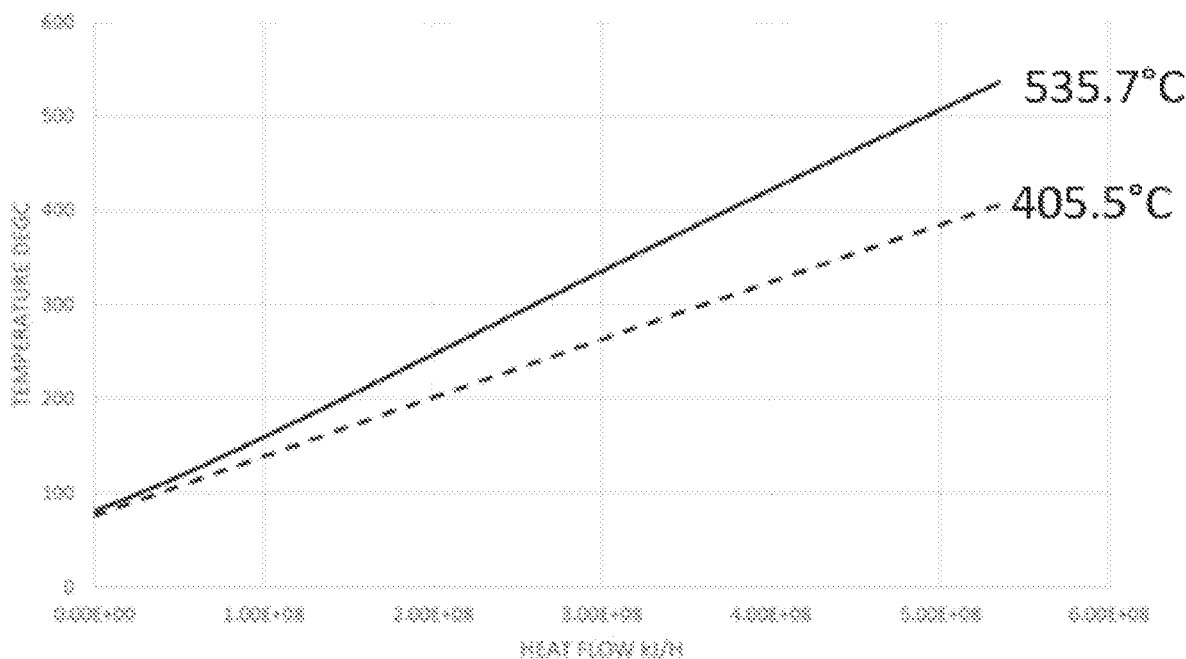

FIGS. 9A-C are a comparison of the recuperator heat exchange charts for the prior art system of FIG. 2 and System 005 of FIG. 8 and Table 8. For the prior art system of FIG. 2, the Hot Exhaust PCF Stream exchanges heat directly with the Cold High-Pressure PCF Stream. The Hot Exhaust PCF Stream enters the heat exchanger at about 80 bar and about 536° C. The Cold High-Pressure PCF Stream enters the heat exchanger at about 450 bar and 53° C. or hot-end to cold-end differences of about 370 bar and about 380° C. The Hot High-Pressure PCF Stream leaves this exchanger at about 429° C. and the Cool Low-Pressure PCF Stream leaves at about 58° C.

Those skilled in the art of heat exchanger design and selection would generally select a Printed Circuit Heat Exchanger (PCHE) type heat exchange device for these extreme differences. Unfortunately, a PCHE type device is limited in size and can limit the size of a power plant according to the prior art system of FIG. 2 to about 10 MW. In contrast, the recuperator system of System 005 can have separate coils of finned tubes for the Hot Exhaust PCF stream and the Cold High-Pressure PCF Stream arranged in one or more contained housings with IHTF circulating about the separate coils. Such arrangements of separate heat transfer devices (e.g., coils) with an IHTF are well suited to large thermal differentials since the high-pressure and lower pressure PCF streams can be contained in separate coils that are affected independently by the pressure and temperature difference. It is surprising and unexpected result that the pressure and temperature differences do not restrict the scale of such a recuperator system.

These coils are represented by the charts for System 005 Recuperator E-104 and System 005 Recuperator E-102 and correspond to the System 005 flow diagram of FIG. 8 and Table 8. The System 005 Recuperator E-104 chart of FIGS. 9A-C depicts the Hot Exhaust PCF Stream entering the exchanger at about 536° C. and the IHTF stream entering at about 58° C. These streams exchange heat and leave at about 65° C. for the Cool Low-Pressure PCF Stream and about 425° C. for the IHTF stream IHT1002.

This IHTF stream then circulates to the E-102 part of the recuperator system and the System 005 Recuperator E-102 chart shows that the IHTF stream enters at about 425° C. (as above) and leaves at about 58° C. (e.g., IHT1003). The Cold High-Pressure PCF Stream enters the heat exchange device at about 53° C. and leaves as the Hot High-Pressure PCF Stream at about 420° C.

As shown in the charts of FIG. 9A-C, the parts of the System 005 recuperator system represented by E-102 and E-104 are modelled like a single pass heat exchanger. That is, all the available heat from Hot Exhaust PCF Stream is transferred to the IHTF stream and then all the available heat of this IHTF stream is transferred to the Cold High-Pressure PCF Stream. However, each of these parts of the heat exchange device, i.e., the part associated with E-104 and the part associated with E-102, can be divided into multiple passes. In this manner, the E-104 part can be divided into 2, 3, 4, 5 or more sections, passes or coils and similarly the E-102 part can be divided into 2, 3, 4, 5 or more sections, passes or coils and these multiple sections, passes or coils contained within one or more housings.

For both the prior art system of FIG. 2 and the System 005, the charts of FIG. 9A-C assume a minimum approach temperature of 5° C. This comparison shows that the recuperator of the prior art system of FIG. 2 may be more effective than the System 005 recuperator system on a simple theoretical heat transfer design basis. This primarily accounts for the 50.2% vs. 48.8% cycle efficiency difference. This increased effectiveness assumes that the PCHE that is the best selection for the prior art system of FIG. 2 has about the same effective heat transfer surface area as that of the recuperator of System 005. For practical applications, much more cost-effective surface area can be used for the recuperator of System 005 than for a PCHE resulting in a more effective recuperator at a larger scale than for the prior art system of FIG. 2.

Examination of the System 005 Recuperator E-102 chart shows that the hot-end pinch and cold-end pinch of this chart is nearly equal. In fact, the IHTF circulation rate was adjusted until these pinch temperature differences are approximately equal. For reference, the hot-end pinch is the difference of the hot stream temperature entering the heat exchange device less the cold stream temperature leaving the device. Conversely, the cold-end pinch is the temperature of the hot stream leaving the device less the temperature of the cold stream entering the device.

This is represented by: T(HOT)IN−T(COLD)OUT=T(HOT)OUT−T(COLD)IN

Or: PV=T(HOT)IN−T(HOT)OUT+T(COLD)IN−T(COLD)OUT where PV is the Present Value as calculated by an analog or digital control system. A setpoint value can be selected for this PV and the control system can adjust the IHTF circulation rate until the PV setpoint value is attained.

FIGS. 10A-F demonstrate the effect of adjusting the IHTF circulation rate on the cold versus hot pinch of the E-102 part of the System 005 recuperator and the overall cycle efficiency. The surprising and unexpected result is that the best cycle efficiency is found with a PV equal to about 0° C. However, it is assumed that differences between the ideal plant design and the actual operating plant can lead to optimum setpoints that differ from 0° C. As such, the PV setpoint for the recuperator temperature balance can range from about −40° C. to +40° C.

Further, in some cases it can be difficult to measure the temperature of these streams at the various inlets and exits of the heat exchange devices. Accordingly, alternate temperature measurement locations can used with similar control functionality and necessary adjustments of the setpoint for control of the IHTF circulation rate. Examples of such alternative measurement locations include locations upstream and/or downstream of the various inlets and exits, locations on or about the heat exchange device like housing or pipe temperatures. Indirect measurements can also be used, such as thermal strain, stress and/or distortion of pipe, coils or other similar components.

Figure 11:
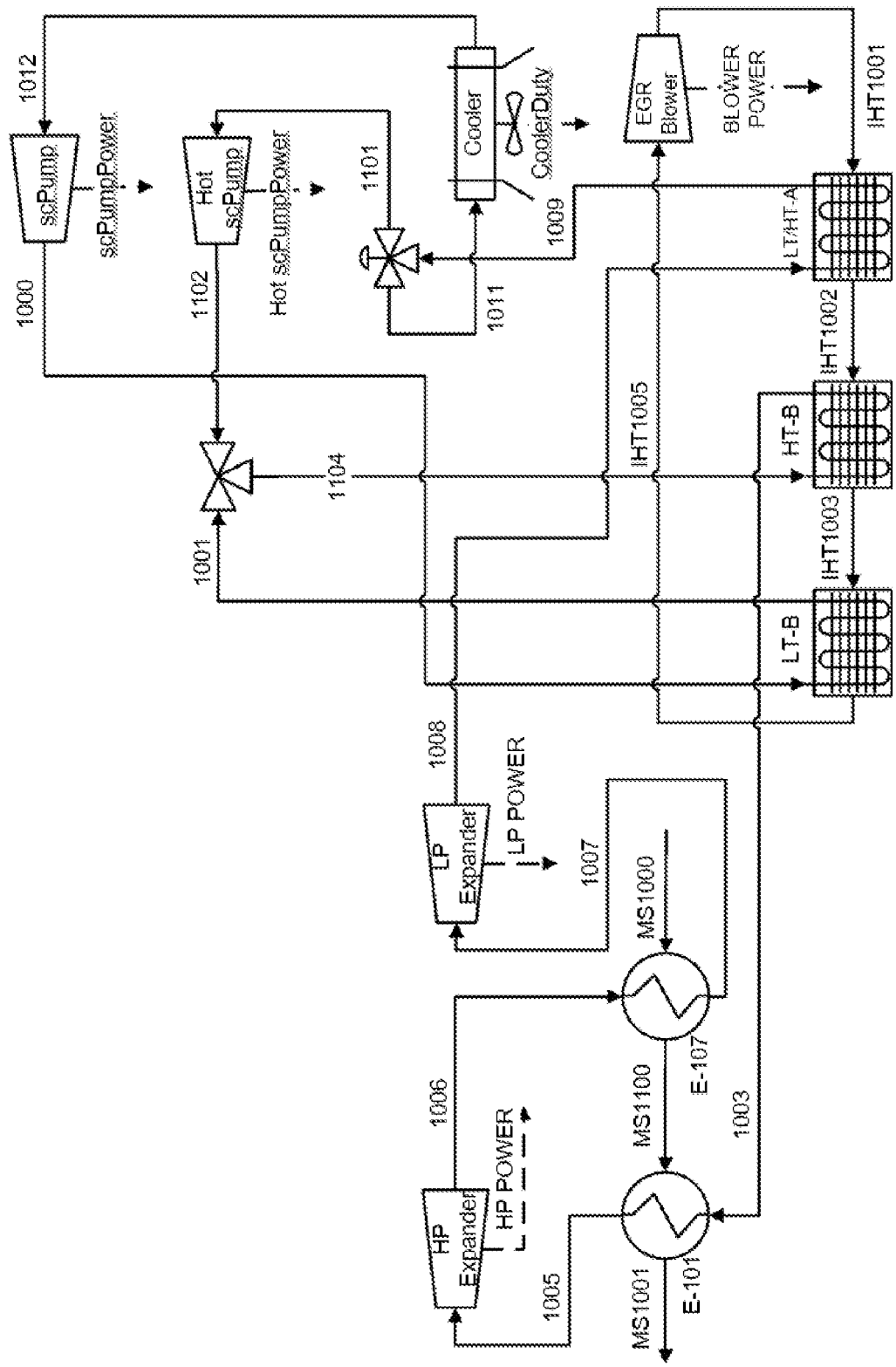
FIG. 11 depicts another alternative supercritical CO2 power cycle that implements the reheat and recompression system of the Prior Art system depicted in FIG. 3 in which an intermediate heat transfer loop is used to transfer heat among the supercritical power cycle fluid streams, according to one or more embodiments described herein.

System 006 is depicted in FIG. 11 and Table 9. System 006 is a modification of the prior art system of FIG. 3 to incorporate a Recuperator IHTF circulation loop like the recuperator IHTF circulation loops of System 002, 003, 004 and 005. As discussed for the prior art system of FIG. 3, System 006 includes a recompression loop that splits the Cool Low-Pressure PCF Stream 1009 following the low-temperature recuperator into at least two portions, a first portion and a second portion. The first portion, 1st Cool Low-Pressure PCF Stream 1011 is circulated to the tertiary cooler in which excess heat is rejected to an external system, such as a cooling tower, air-cooler or a similar heat exchange device to form a Cold Low-Pressure PCF Stream 1012. This Cold Low-Pressure PCF Stream is circulated to a pumping and/or compressing device, such as a pump, compressor and/or supercritical pump, and raised to a high pressure to form the Cold High-Pressure PCF Stream 1000). The second portion of the 2nd Cool Low-Pressure PCF Stream 1101 is circulated to another pumping and/or compressing device, such as a pump, compressor and/or a supercritical pump or similar device and raised to a similar pressure as the Cold High-Pressure PCF Stream to form the 2nd Warm High-Pressure PCF Stream 1102.

The function of the low-temperature and high-temperature recuperators (e.g., LT-A and HT-A of FIG. 3) are provided by three or more discreet heat transfer devices that can be arranged in series and confined within one or more contained housings that are fluidly connected. At least a portion, substantially all or all an IHTF is circulated in series through the one or more housings and about the three or more discreet heat transfer devices. In some embodiments, all or substantially all the IHTF is circulated about the three or more discreet heat transfer devices. In other embodiments, a portion of the IHTF can bypass one or more of the discreet heat transfer devices.

At least a portion of the Hot Exhaust PCF Stream 1008 is circulated to the first of the three or more discreet heat transfer devices (e.g., LT/HT-A) to cool the Hot Exhaust PCF Stream to form the Cool Low-Pressure PCF Stream 1009 and to heat the cool IHTF stream IHT1001 to form a hot IHTF stream IHT1002.

At least a portion of the Cold High-Pressure PCF Stream 1000 is circulated to the third of the three or more discreet heat transfer devices to heat this Cold High-Pressure PCF Stream to form a 1st Warm High-Pressure PCF Stream 1001 and to cool the warm IHTF stream IHT1003 to form a cold IHTF stream IHT1005.

At least a portion of the 1st Warm High-Pressure PCF Stream 1001 is mixed with the 2nd Warm High-Pressure PCF Stream 1102 to form the Mixed Warm High-Pressure PCF Stream 1104. The Mixed Warm High-Pressure PCF Stream is circulated to the second of the three or more heat transfer devices to heat the Mixed Warm High-Pressure PCF Stream to form the Hot High-Pressure PCF Stream 1003 and to cool the IHTF stream IHT1002 to form a warm IHTF stream IHT1003

The IHTF streams can be circulated about the IHTF loop to the one or more contained housings that confine the three or more discreet heat transfer devices by a blower, compressor, pump or natural circulation via temperature difference or other natural convection means, collectively referred to as the means of IHTF circulation. This means of IHTF circulation my include variable speed devices, variable vane or blade pitch devices and/or variable flow restriction devices. Such variable flow restriction devices can include a valve, damper, variable area or similar devices. The means of IHTF circulation can be located at one or more locations with the IHTF loop. In FIG. 11, a blower is located between the cold IHTF stream and the cool IHTF stream. Vertical legs of differing IHTF stream temperatures can be arranged to promote the natural circulation of the IHTF about the IHTF loop. Further, the one or more contained housings can include the means of IHTF circulation as a part of the one or more contained housings.

A PHTF stream can be circulated to an external heat source, such as a solar collector, nuclear reactor, combustion process, thermal reaction process or other high value heat sources, to provide a heated PHTF stream. At least a portion of the heated PHTF can be circulated to a heat transfer device to further heat the Hot High-Pressure PCF Stream 1003 to form the Very Hot High-Pressure PCF Stream 1005. At least a portion of the Very Hot High-Pressure PCF Stream can circulate to an expansion device, such as an expander, turbine, or a similar device known to those skilled in the art, to form a turbine or expander exhaust stream at a lower pressure and temperature and to generator power. As with SYSTEM 004 and 005, a multistage expansion device with reheating of the exhaust PCF stream from each stage, except the last stage, prior to entry into the next stage of expansion. Each stage generating more power. Following the last stage, the Hot Exhaust PCF Stream 1008 is formed.

As shown in FIG. 11 for SYSTEM 006, the PHTF is configured to directly transfer heat to the PCF streams. Optionally, an IHTF loop like SYSTEM 001, SYSTEM 002 and/or SYSTEM 004 can be used to isolate the PHTF from the PCF streams. If a combustion or thermal reaction process is used to provide at least a portion of the external heat to any of the SYSTEMS 001, 002, 003, 004, 005 or 006, then the combustion or thermal reaction effluent streams can replace the PHTF for one or more of the heat transfer devices that can heat the Hot High-Pressure PCF Stream or reheat an expander exhaust stream (e.g. HP Expander Exhaust PCF Stream) to form a reheated stream (e.g. Reheated Expander PCF Stream) that is circulated to the next stage of expansion as described. Further, an $sCO_2$ power cycle can be integrated into a hybrid cycle that can include any two or more $sCO_2$, steam Rankine, organic Rankine or gas turbine power cycles.

The combustion or thermal reaction process can include a catalytic process and/or a catalyst system and the catalytic process or catalyst system can include catalyst either wholly external to a heat transfer device or catalyst that is within at least a part of a heat transfer device. Further, the flow rate and conditions of the PCF stream flowing about the heat transfer device that includes a combustion or thermal reaction process can be adjusted to vary the heat removal and so the temperature of the combustion or reaction process.

Selection of reactants for a combustion or thermal reaction process can be selected to avoid emissions of greenhouse gases including but not limited to $CO_2$ and/or to increase the concentration of such greenhouse gases in the effluent to make later separation, disposal and/or use more economic. Reactants can include, air, enriched air, oxygen, hydrogen, ammonia and other reactants know to those skilled in the art.

Although not shown, an alternative version of System 006 can include a single stage expander with no reheat or two or more stages of expansion that with or without reheat.

Figure 3:
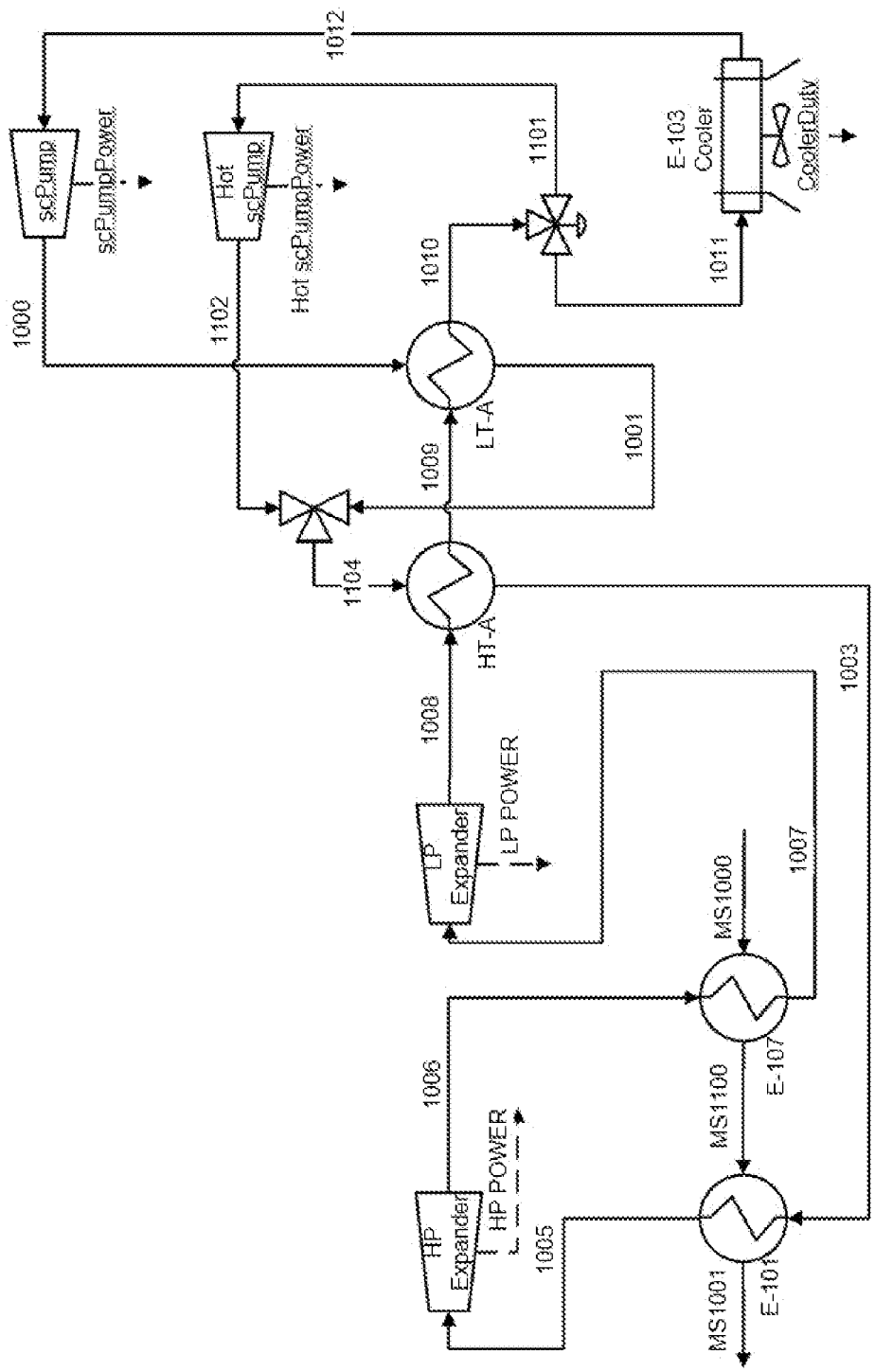
FIG. 3 depicts a prior art supercritical CO2 power cycle with reheat and recompression of the partly cooled expander exhaust.
Figure 12A:
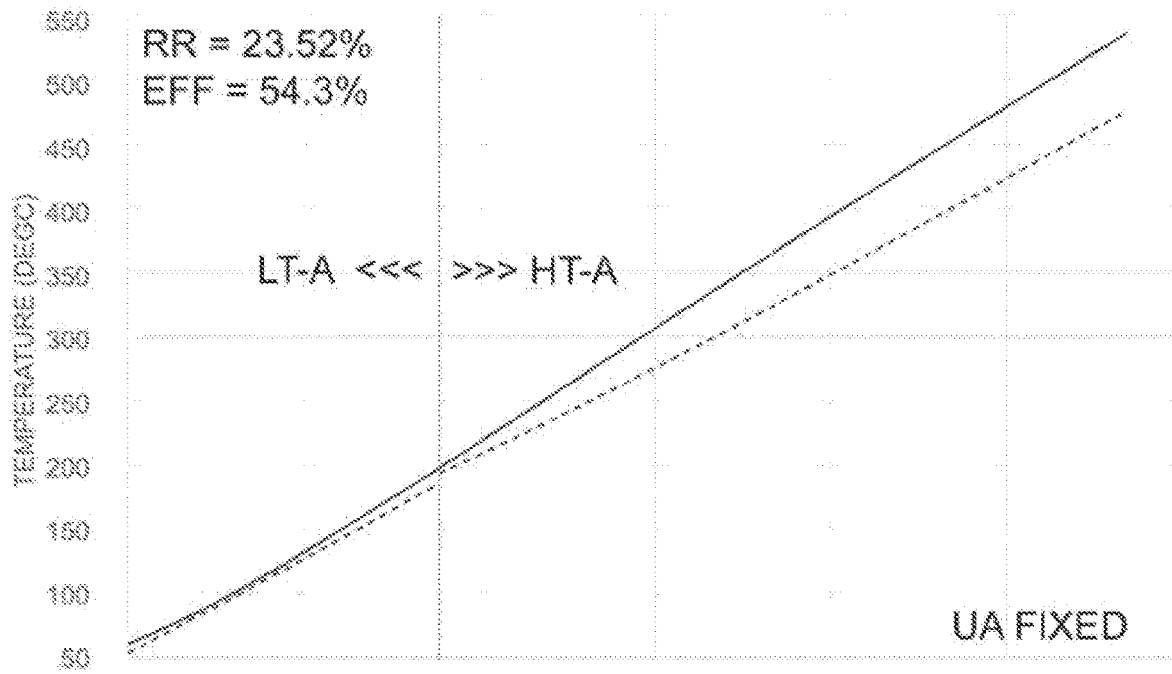
FIGS. 12A-C show the temperature versus heat flow for the low temperature and high temperature recuperators of the Prior Art system depicted in FIG. 3 with changing ratios of recompressed supercritical fluid flow rate versus the overall supercritical fluid flow rate.
Figure 12B:
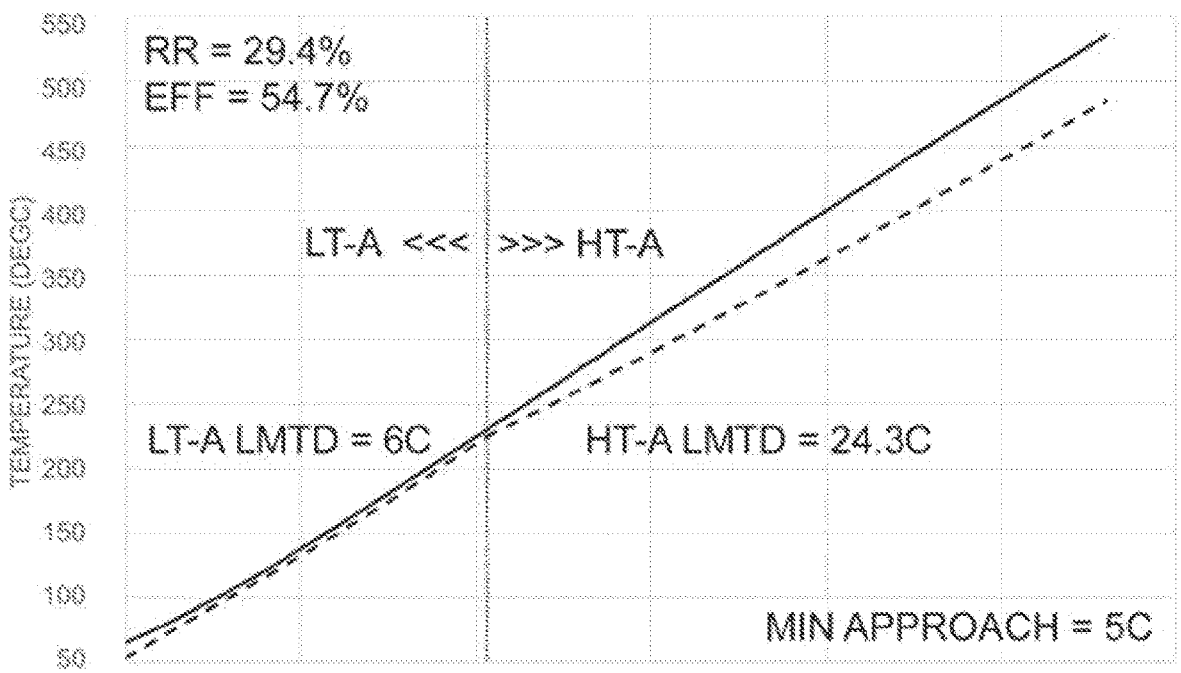
Figure 12C:
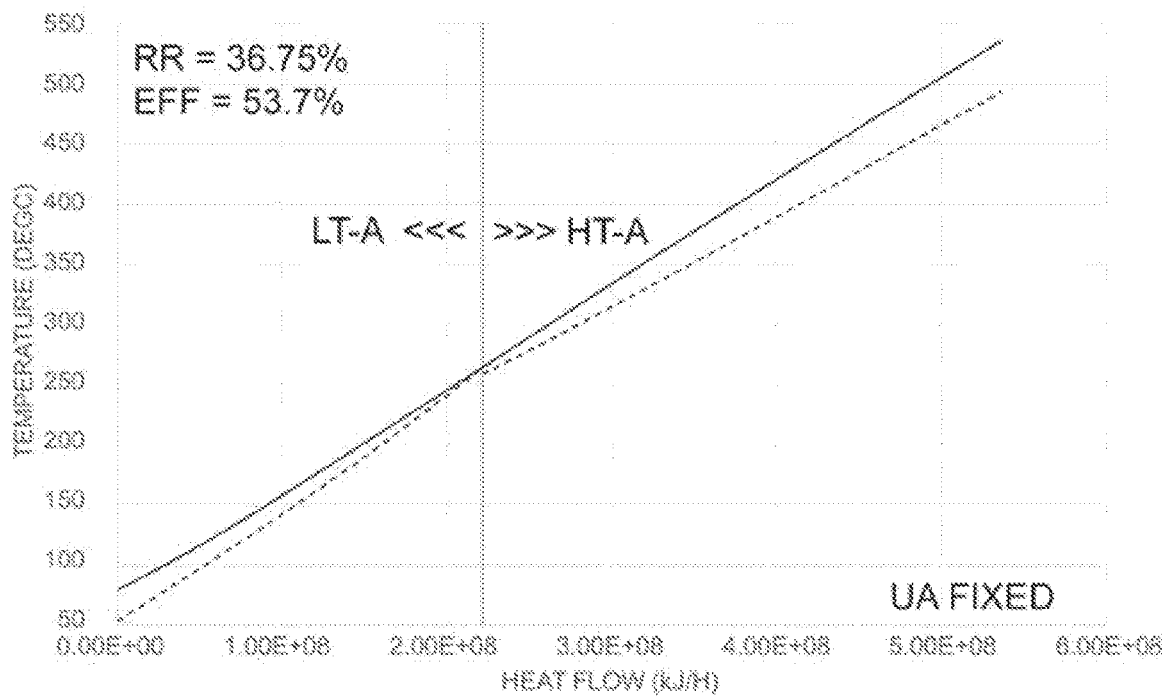

FIGS. 12A-C depicts the temperature versus heat flow of the low-temperature and high-temperature recuperators of the prior art system of FIG. 3. The center chart for RR=29.4% represents the highest cycle efficiency for this example for which the 2nd Cool Low-Pressure PCF Stream 1101 is 29.4% of the flow rate total of the 1st Cool Low-Pressure PCF Stream and 2nd Cool Low-Pressure PCF Stream. For this RR ratio, the cycle efficiency for example 3 is found at 54.75%. For this condition, it is found that the temperature of the 1st Warm High-Pressure PCF Stream 1001 is approximately equal to the temperature of the Mixed Warm High-Pressure PCF Stream 1104. Stated in another manner, the stream exiting the cold side of the low-temperature recuperator can be approximately equal to the stream entering the cold side of the high-temperature recuperator to achieve the highest cycle efficiency of the power cycle. And the flow rate of the second portion of the 2nd Cool Low-Pressure PCF Stream can be adjusted versus the total flow rate of the Cool Low-Pressure PCF Stream to cause these temperatures to be approximately equal. This is equivalent to adjusting the RR ratio.

Using the stream number designations of FIG. 3 as a placeholder, this is represented by: $PV=T(\mathbf{1001})-T(\mathbf{1104})$ where PV is the Present Value as calculated by an analog or digital control system. A setpoint value can be selected for this PV and the control system can adjust the RR ratio until the PV value is attained.

To allow such adjustment of the RR ratio, the pump compressor, supercritical pump or similar device, for example as depicted as "Hot scPump" in FIG. 3, can include a variable speed and/or variable blade or vane device and/or a variable flow resistance device to allow adjustment of 2nd Cool Low-Pressure PCF Stream.

To demonstrate the effectiveness of this control method, the equivalent heat transfer areas of the low-temperature and high-temperature recuperators were kept constant while the RR ratios were reduced from 29.4% to 23.52% in the chart of FIG. 12A and increased to 36.75% in the bottom chart of FIG. 12C. For both, the cycle efficiencies were reduced to 54.7% and 53.7% respectively. Further, close examination of the cold-side (dashed) lines for each of these charts shows a discontinuous temperature between the LT-A and HT-A parts of these charts. These discontinuities result demonstrate an inefficient use of the heat transfer area and cause at least a portion of the cycle efficiency loss.

Figure 13A:
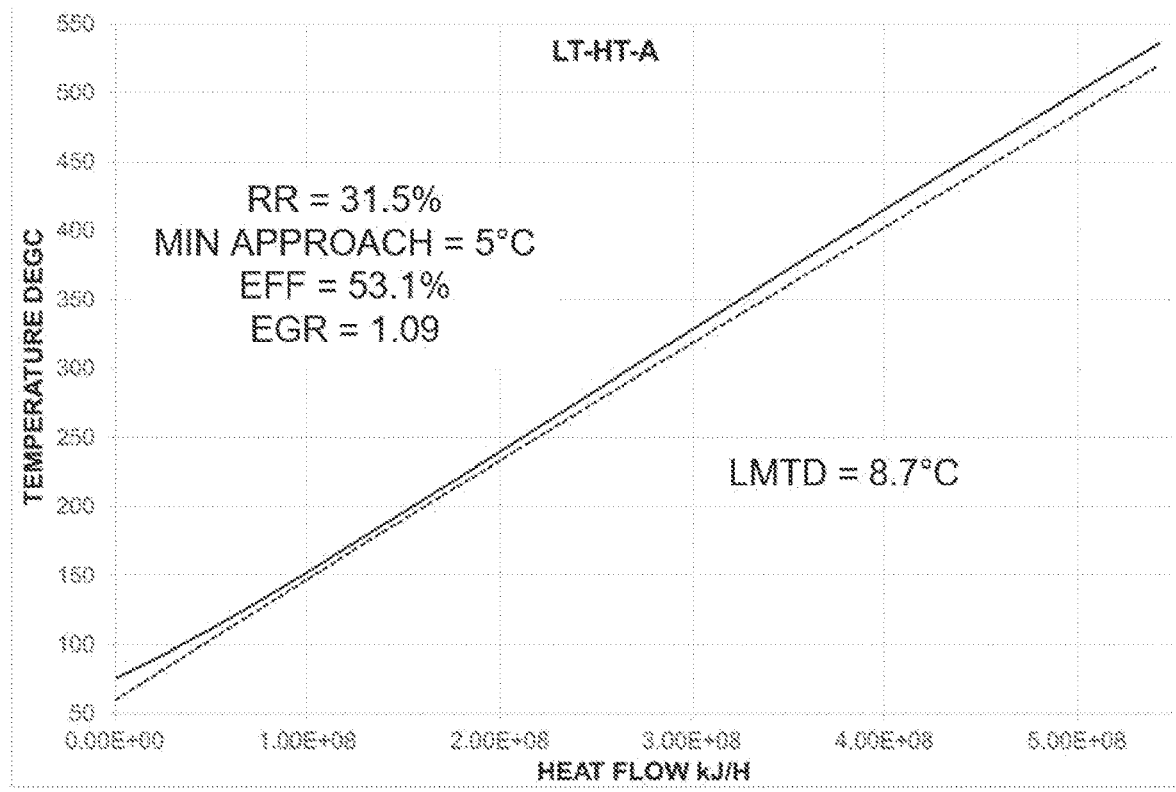
FIGS. 13A-B show the temperature versus heat flow for the low temperature and high temperature recuperators of System 006.
Figure 13B:
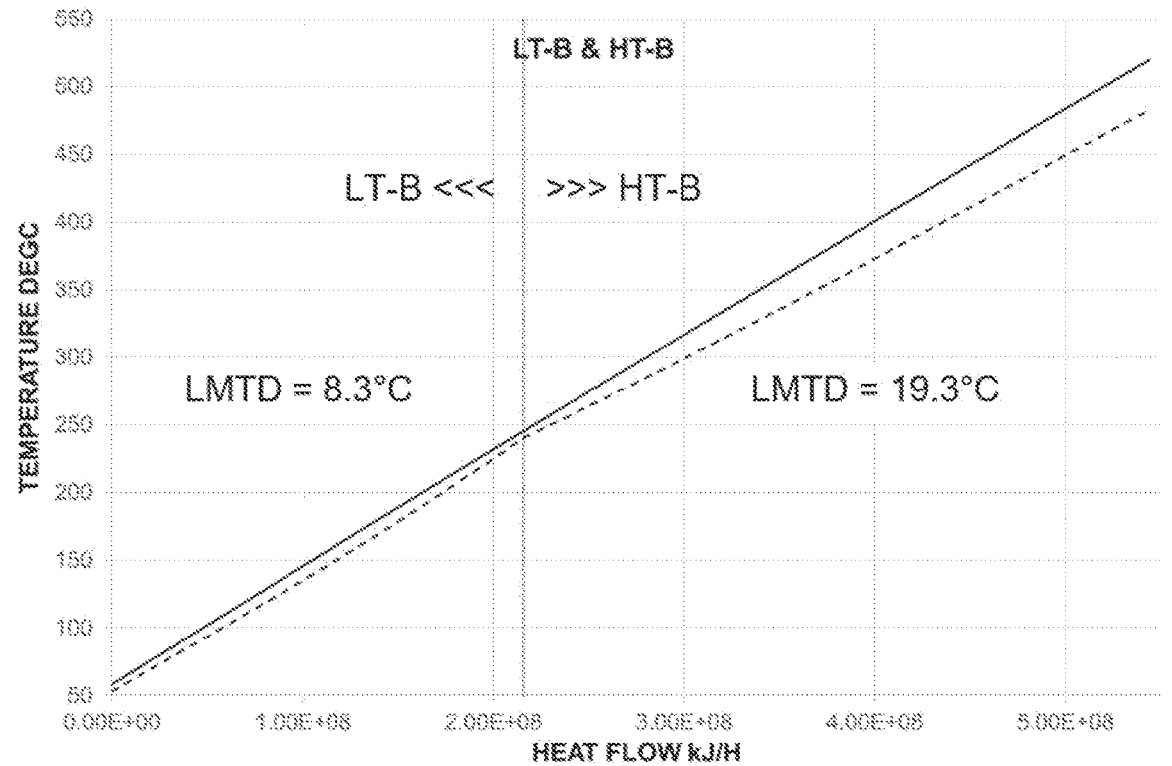

FIGS. 13A-B shows the temperature versus heat flow of the low and high temperature recuperators of SYSTEM 006. For SYSTEM 006, the recuperator system includes at least three heat transfer devices. In FIG. 11 and as labeled on FIGS. 13A-B, these heat transfer devices are LT/HT-A, HT-B and LT-B or the first, second and third heat transfer devices of the description of FIG. 11. Like the findings discussed for FIGS. 10A-F, the cycle efficiency for the power plant is increased by adjusting the IHTF circulation rate so that the cold-end and hot-end pinches of the LT-B or third heat transfer device are approximately balanced. A similar control method to adjust the IHTF circulation rate can also be employed.

This is represented for LT-B or a similarly applied heat exchange device by: $PV=T(HOT)IN-T(HOT)OUT+T(COLD)IN-T(COLD)OUT$ where PV is the Present Value as calculated by an analog or digital control system. A setpoint value can be selected for this PV and the control system can adjust the IHTF circulation rate until the PV value is attained.

Figure 14A:
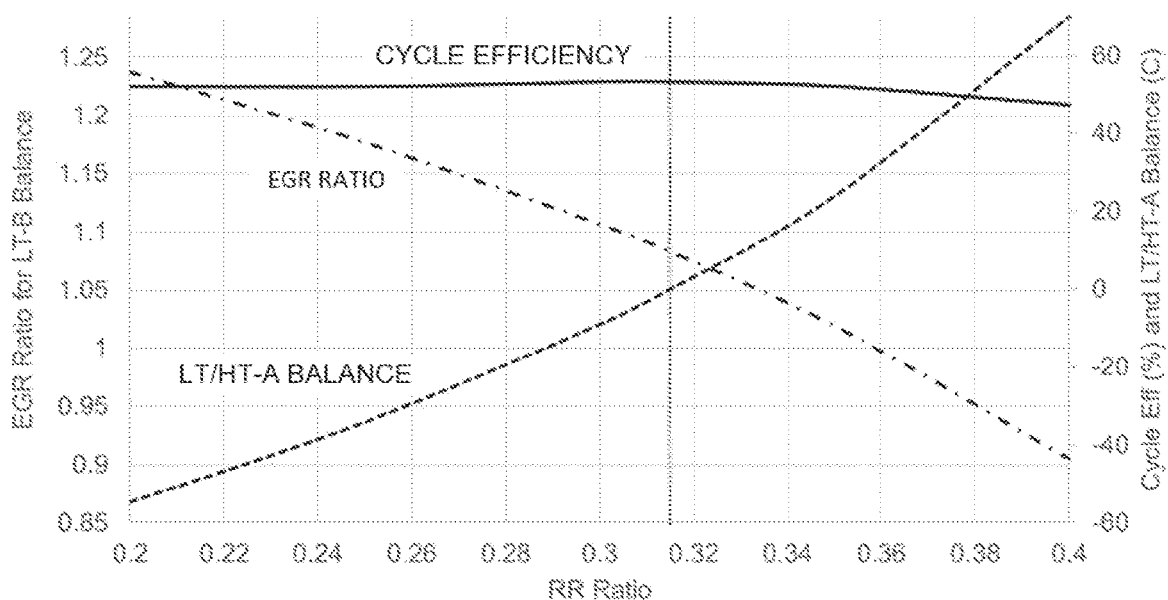
FIGS. 14A-B show various charts that demonstrate the basis for adjustment and control of the recompression and intermediate heat transfer fluid circulation rates to achieve a maximum cycle efficiency.
Figure 14B:
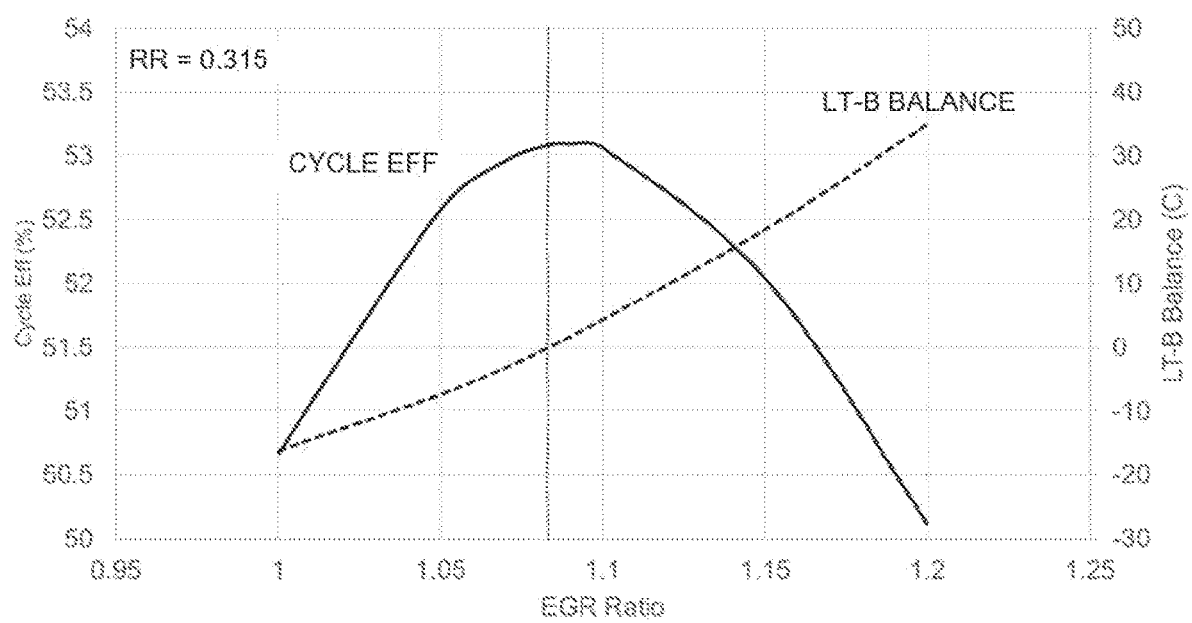

FIGS. 14A-B show the effect of changing values of the RR ratio and the IHTF circulation rate on the overall cycle efficiency of the power plant, the balance of the cold-end and hot-end pinches of the LT/HT-A and LT-B heat transfer devices. That is the first and third of the three or more heat transfer devices of SYSTEM 006. The IHTF circulation rate for this example is denoted as the EGR ratio. This is the ratio of mass flowrates of the IHTF circulation and total circulation of the PCF. For this example, depicted in FIGS. 14A-B, the IHTF is nitrogen or dry air and the PCF is supercritical $CO_2$. The value of the EGR ratio therefore reflects the mass and molar densities of these exemplary fluids. Selection of other fluids will necessarily change the values that would be reflected in these charts, but the principal guidance of the charts will remain.

The surprising and unexpected result shown by the chart of FIG. 14A is that the best cycle efficiency of the power plant is achieved when the RR ratio is adjusted such that the cold-end pinch is approximately equal to the hot-end pinch of LT/HT-A, which is described as the first of the three or more heat transfer devices of SYSTEM 006. This temperature balance can be described in a similar manner as was previously described for the cold-end versus hot-end pinch for LT-B. So, for LT/HT-A the control method can be given as: PV=T(HOT)IN−T(HOT)OUT+T(COLD)IN−T(COLD)OUT where PV is the Present Value as calculated by an analog or digital control system. A setpoint value can be selected for this PV and the control system can adjust the RR ratio until the PV value is attained.

In practice, for SYSTEM 006, the recompression rate represented by RR and the IHTF circulation rate represented by the EGR ratio can be controlled simultaneously, sequentially and/or using a multi-variable control system to adjust both the RR and EGR ratios to achieve the setpoints for both the LT-B and the LT/HT-A temperature balances.

Alternate measurement locations for the calculations of the PV for LT-B and the PV for LH/HT-A balances can be used. As such, other control methods that employ the sum and/or difference of two or more temperatures within the power plant to adjust the RR and/or EGR ratios can also be anticipated by these control method disclosures.

While the chart of FIG. 14A shows the impact RR and EGR ratios on SYSTEM 006, the chart of FIG. 14B shows the effectiveness of the adjustment of the EGR ratio to maximize the cycle efficiency of the power plant.

TABLE 1

Sample Energy Balance and Stream Summary for PRIOR ART Example 1

| | | | |
|---|---|---|---|
| Expander Inlet Temperature | 650.0 | ° C. | |
| Expander Inlet Pressure | 450 | bara | |
| Reheat Temperature | N/A | ° C. | |
| scCO2 Circulation Rate | 1000.0 | T/hr | |
| Assumed Heat Loss | 1.0% | | |
| Overall Cycle Efficiency | 48.22% | | |
| Energy Streams | | | |
| | | | |
| Primary Heat Input Including Loss | 116.6 | MW | |
| Gross Turbine Power | 70.09 | MW | |
| scPump Power | 12.47 | MW | |
| Other House Loads | 1.40 | MW | |
| EGR Blower Power | N/A | MW | |
| Tertiary Cooler Heat Rejection | 57.8 | MW | |
| Net Power | 56.22 | MW | |

| Stream No. (—) | Description (—) | Comp (—) | State (—) | Temp (° C.) | Pres (bara) | Flow Rate (T/hr) | Heat Flow (MW) |
|---|---|---|---|---|---|---|---|
| MS1000 | Primary Heat Input | Molten Salt | LIQ | 730.0 | 10.0 | 470.6 | −427.5 |
| MS1001 | Primary Heat Return | Molten Salt | LIQ | 352.2 | 10.0 | 470.6 | −542.9 |
| 1000 | Cold High-Pressure PCF Stream | CO2 | SC | 53.3 | 450.0 | 1000.0 | −2543.4 |
| 1001 | Hot High-Pressure PCF Stream | CO2 | SC | 332.2 | 449.9 | 1000.0 | −2420.0 |
| 1003 | Very Hot High-Pressure PCF Stream | CO2 | SC | 650.0 | 449.8 | 1000.0 | −2304.6 |
| 1004 | Hot Exhaust PCF Stream | CO2 | SC | 427.5 | 80.0 | 1000.0 | −2374.7 |
| 1005 | Cool Low-Pressure PCF Stream | CO2 | SC | 58.4 | 79.9 | 1000.0 | −2498.1 |
| 1006 | Cold Low-Pressure PCF Stream | CO2 | SC | 20.0 | 79.9 | 1000.0 | −2555.9 |

Note for all Tables 1 to 9:
Comp = Composition
State = Fluid state of vapor (VAP), liquid (LIQ), supercritical fluid (SC)
Temp = Temperature
Pres = Pressure
Flow Rate = Mass Flow Rate in metric tonnes per hour (T/hr)

TABLE 2

Sample Energy Balance and Stream Summary for PRIOR ART Example 2

| | | | |
|---|---|---|---|
| Expander Inlet Temperature | 650.0 | ° C. | |
| Expander Inlet Pressure | 450 | bara | |
| Reheat Temperature | N/A | ° C. | |
| scCO2 Circulation Rate | 1000.0 | T/hr | |
| Assumed Heat Loss | 1.0% | | |
| Overall Cycle Efficiency | 50.22% | | |
| Energy Streams | | | |
| | | | |
| Primary Heat Input Including Loss | 121.5 | MW | |
| Gross Turbine Power | 75.01 | MW | |
| scPump Power | 12.47 | MW | |
| Other House Loads | 1.50 | MW | |

TABLE 2-continued

Sample Energy Balance and Stream Summary for PRIOR ART Example 2

| | | | |
|---|---|---|---|
| EGR Blower Power | N/A | MW | |
| Tertiary Cooler Heat Rejection | 57.8 | MW | |
| Net Power | 61.04 | MW | |

| Stream No. (—) | Description (—) | Comp (—) | State (—) | Temp (° C.) | Pres (bara) | Flow Rate (T/hr) | Heat Flow (MW) |
|---|---|---|---|---|---|---|---|
| MS1000 | Primary Heat Input | Molten Salt | LIQ | 730.0 | 10.0 | 1001.9 | −910.0 |
| MS1001 | Primary Heat Return | Molten Salt | LIQ | 551.2 | 9.0 | 1001.9 | −1030.4 |
| 1000 | Cold High-Pressure PCF Stream | CO2 | SC | 53.3 | 450.0 | 1000.0 | −2543.4 |
| 1001 | Hot High-Pressure PCF Stream | CO2 | SC | 429.3 | 449.9 | 1000.0 | −2384.2 |
| 1003 | Very Hot High-Pressure PCF Stream | CO2 | SC | 650.0 | 449.9 | 1000.0 | −2304.6 |
| 1004 | HP Expander Exhaust PCF Stream | CO2 | SC | 532.4 | 190.0 | 1000.0 | −2342.9 |
| 1005 | Reheated Expander PCF Stream | CO2 | SC | 650.0 | 189.0 | 1000.0 | −2302.2 |
| 1006 | Hot Exhaust PCF Stream | CO2 | SC | 536.3 | 80.0 | 1000.0 | −2338.9 |
| 1007 | Cool Low-Pressure PCF Stream | CO2 | SC | 58.3 | 79.9 | 1000.0 | −2498.1 |
| 1008 | Cold Low-Pressure PCF Stream | CO2 | SC | 20.0 | 79.9 | 1000.0 | −2555.9 |

TABLE 3

Sample Energy Balance and Stream Summary for PRIOR ART Example 3

| | | |
|---|---|---|
| Expander Inlet Temperature | 650.0 | ° C. |
| Expander Inlet Pressure | 450 | bara |
| Reheat Temperature | 650.0 | ° C. |
| scCO2 Circulation Rate | 706.0 | T/hr |
| Assumed Heat Loss | 1.0% | |
| Overall Cycle Efficiency | 54.74% | |
| Energy Streams | | |
| Primary Heat Input Including Loss | 101.2 | MW |
| Gross Turbine Power | 75.20 | MW |
| scPump Power | 8.80 | MW |
| Hot scPump Power | 9.50 | MW |
| Other House Loads | 1.50 | MW |
| EGR Blower Power | N/A | MW |
| Tertiary Cooler Heat Rejection | 43.3 | MW |
| Net Power | 55.39 | MW |

| Stream No. (—) | Description (—) | Comp (—) | State (—) | Temp (° C.) | Pres (bara) | Flow Rate (T/hr) | Heat Flow (MW) |
|---|---|---|---|---|---|---|---|
| MS1000 | Primary Heat Input | Molten Salt | LIQ | 730.0 | 10.0 | 1001.6 | −909.8 |
| MS1001 | Primary Heat Return | Molten Salt | LIQ | 581.5 | 10.0 | 1001.6 | −1009.9 |
| 1000 | Cold High-Pressure PCF Stream | CO2 | SC | 53.3 | 450.0 | 706.0 | −1795.7 |
| 1001 | 1st Warm High-Pressure PCF Stream | CO2 | SC | 225.0 | 450.0 | 706.0 | −1738.4 |
| 1003 | Hot High-Pressure PCF Stream | CO2 | SC | 484.9 | 450.0 | 1000.0 | −2364.1 |
| 1005 | Very Hot High-Pressure PCF Stream | CO2 | SC | 650.0 | 449.9 | 1000.0 | −2304.6 |
| 1006 | HP Expander Exhaust PCF Stream | CO2 | SC | 532.4 | 190.0 | 1000.0 | −2342.9 |
| 1007 | Reheated Expander PCF Stream | CO2 | SC | 650.0 | 189.9 | 1000.0 | −2302.2 |
| 1008 | Hot Exhaust PCF Stream | CO2 | SC | 535.7 | 80.0 | 1000.0 | −2339.1 |
| 1009 | Part-Cooled Exhaust PCF Stream | CO2 | SC | 230.0 | 80.0 | 1000.0 | −2437.4 |
| 1010 | Cool Low-Pressure PCF Stream | CO2 | SC | 65.2 | 80.0 | 1000.0 | −2494.6 |
| 1011 | 1st Cool Low-Pressure PCF Stream | CO2 | SC | 65.2 | 80.0 | 706.0 | −1761.2 |
| 1012 | Cold Low-Pressure PCF Stream | CO2 | SC | 20.0 | 80.0 | 706.0 | −1804.5 |
| 1101 | 2nd Cool Low-Pressure PCF Stream | CO2 | SC | 65.2 | 80.0 | 294.0 | −733.4 |
| 1102 | 2nd Warm High-Pressure PCF Stream | CO2 | SC | 225.3 | 450.0 | 294.0 | −723.9 |
| 1104 | Mixed Warm High-Pressure PCF Stream | CO2 | SC | 225.1 | 450.0 | 1000.0 | −2462.4 |

TABLE 4

Sample Energy Balance and Stream Summary for SYSTEM 001

| | | |
|---|---|---|
| Expander Inlet Temperature | 650.0 | ° C. |
| Expander Inlet Pressure | 450 | bara |
| Reheat Temperature | N/A | ° C. |
| scCO2 Circulation Rate | 1000.0 | T/hr |
| Assumed Heat Loss | 1.0% | |
| Overall Cycle Efficiency | 45.3% | |

TABLE 4-continued

Sample Energy Balance and Stream Summary for SYSTEM 001

Energy Streams

| | | |
|---|---|---|
| Primary Heat Input Including Loss | 121.9 | MW |
| Gross Turbine Power | 70.09 | MW |
| scPump Power | 12.47 | MW |
| Other House Loads | 1.40 | MW |
| EGR Blower Power | 1.01 | MW |
| Tertiary Cooler Heat Rejection | 64.07 | MW |
| Net Power | 55.21 | MW |

| Stream No. (—) | Description (—) | Comp (—) | State (—) | Temp (° C.) | Pres (bara) | Flow Rate (T/hr) | Heat Flow (MW) |
|---|---|---|---|---|---|---|---|
| MS1000 | Primary Heat Input | Molten Salt | LIQ | 730.0 | 10.0 | 582.9 | −529.4 |
| MS1001 | Primary Heat Return | Molten Salt | LIQ | 415.3 | 9.0 | 582.9 | −650.1 |
| 1000 | Cold High-Pressure PCF Stream | CO2 | SC | 53.3 | 450.0 | 1000.0 | −2543.4 |
| 1001 | Hot High-Pressure PCF Stream | CO2 | SC | 324.3 | 449.9 | 1000.0 | −2423.0 |
| 1003 | Very Hot High-Pressure PCF Stream | CO2 | SC | 650.0 | 449.8 | 1000.0 | −2304.6 |
| 1004 | Hot Exhaust PCF Stream | CO2 | SC | 427.5 | 80.0 | 1000.0 | −2374.7 |
| 1005 | Cool Low-Pressure PCF Stream | CO2 | SC | 71.0 | 79.9 | 1000.0 | −2491.8 |
| 1006 | Cold Low-Pressure PCF Stream | CO2 | SC | 20.0 | 79.9 | 1000.0 | −2555.9 |
| IHT1000 | Ex EGR Blower | Air or $N_2$ | VAP | 66.0 | 1.0 | 1480.0 | 17.5 |
| IHT1002 | To E-102 | Air or $N_2$ | VAP | 331.9 | 1.0 | 1480.0 | 134.7 |
| IHT1003 | To E-105 | Air or $N_2$ | VAP | 58.3 | 1.0 | 1480.0 | 14.2 |
| IHT1004 | To E-100 | Air or $N_2$ | VAP | 395.3 | 1.0 | 1480.0 | 163.6 |
| IHT1005 | To E-101 | Air or $N_2$ | VAP | 655.0 | 1.0 | 1480.0 | 284.3 |
| IHT1006 | To E-105 | Air or $N_2$ | VAP | 400.3 | 1.0 | 1480.0 | 165.9 |
| IHT1007 | To EGR Blower | Air or $N_2$ | VAP | 63.6 | 1.0 | 1480.0 | 16.5 |

TABLE 5

Sample Energy Balance and Stream Summary for SYSTEM 002

| | | |
|---|---|---|
| Expander Inlet Temperature | 650.0 | ° C. |
| Expander Inlet Pressure | 450 | bara |
| Reheat Temperature | N/A | ° C. |
| scCO2 Circulation Rate | 1000.0 | T/hr |
| Assumed Heat Loss | 1.0% | |
| Overall Cycle Efficiency | 46.67% | |

Energy Streams

| | | |
|---|---|---|
| Primary Heat Input Including Loss | 119.3 | MW |
| Gross Turbine Power | 70.09 | MW |
| scPump Power | 12.47 | MW |
| Other House Loads | 1.40 | MW |
| EGR Blower Power | 0.22 | MW |
| Hot EGR Blower Power | 0.33 | MW |
| Tertiary Cooler Heat Rejection | 61.1 | MW |
| Net Power | 55.67 | MW |

| Stream No. (—) | Description (—) | Comp (—) | State (—) | Temp (° C.) | Pres (bara) | Flow Rate (T/hr) | Heat Flow (MW) |
|---|---|---|---|---|---|---|---|
| MS1000 | Primary Heat Input | Molten Salt | LIQ | 730.0 | 10.0 | 479.3 | −435.4 |
| MS1001 | Primary Heat Return | Molten Salt | LIQ | 350.3 | 9.0 | 479.3 | −553.5 |
| 1000 | Cold High-Pressure PCF Stream | CO2 | SC | 53.3 | 450.0 | 1000.0 | −2543.4 |
| 1001 | Hot High-Pressure PCF Stream | CO2 | SC | 324.2 | 449.9 | 1000.0 | −2423.1 |
| 1003 | Very Hot High-Pressure PCF Stream | CO2 | SC | 650.0 | 449.8 | 1000.0 | −2304.6 |
| 1004 | Hot Exhaust PCF Stream | CO2 | SC | 427.5 | 80.0 | 1000.0 | −2374.7 |
| 1005 | Cool Low-Pressure PCF Stream | CO2 | SC | 64.6 | 79.9 | 1000.0 | −2494.9 |
| 1006 | Cold Low-Pressure PCF Stream | CO2 | SC | 20.0 | 79.9 | 1000.0 | −2555.9 |
| IHT1000 | Ex EGR Blower | Air or $N_2$ | VAP | 58.8 | 1.0 | 1480.0 | 14.4 |
| IHT1002 | To E-102 | Air or $N_2$ | VAP | 331.4 | 1.0 | 1480.0 | 134.6 |
| IHT1003 | To EGR Blower | Air or $N_2$ | VAP | 58.3 | 1.0 | 1480.0 | 14.2 |
| IHT1004 | Ex Hot EGR Blower | Air or $N_2$ | VAP | 330.3 | 1.0 | 1000.0 | 90.6 |
| IHT1005 | To E-101 | Air or $N_2$ | VAP | 706.9 | 1.0 | 1000.0 | 208.7 |
| IHT1006 | To Hot EGR Blower | Air or $N_2$ | VAP | 329.2 | 1.0 | 1000.0 | 90.3 |

TABLE 6

Sample Energy Balance and Stream Summary for SYSTEM 003

| | | |
|---|---|---|
| Expander Inlet Temperature | 650.0 | ° C. |
| Expander Inlet Pressure | 450 | bara |
| Reheat Temperature | N/A | ° C. |
| scCO2 Circulation Rate | 1000.0 | T/hr |
| Assumed Heat Loss | 1.0% | |
| Overall Cycle Efficiency | 46.81% | |
| Energy Streams | (MW) | |
| Primary Heat Input Including Loss | 119.7 | MW |
| Gross Turbine Power | 70.09 | MW |
| scPump Power | 12.47 | MW |
| Other House Loads | 1.40 | MW |
| EGR Blower Power | 0.22 | MW |
| Hot EGR Blower Power | N/A | MW |
| Tertiary Cooler Heat Rejection | 61.1 | MW |
| Net Power | 56.01 | MW |

| Stream No. (—) | Description (—) | Comp (—) | State (—) | Temp (° C.) | Pres (bara) | Flow Rate (T/hr) | Heat Flow (MW) |
|---|---|---|---|---|---|---|---|
| MS1000 | Primary Heat Input | Molten Salt | LIQ | 670.0 | 10.0 | 565.8 | −536.9 |
| MS1001 | Primary Heat Return | Molten Salt | LIQ | 344.2 | 10.0 | 565.8 | −655.3 |
| 1000 | Cold High-Pressure PCF Stream | CO2 | SC | 53.3 | 450.0 | 1000.0 | −2543.4 |
| 1001 | Hot High-Pressure PCF Stream | CO2 | SC | 324.2 | 449.9 | 1000.0 | −2423.1 |
| 1003 | Very Hot High-Pressure PCF Stream | CO2 | SC | 650.0 | 449.8 | 1000.0 | −2304.6 |
| 1004 | Hot Exhaust PCF Stream | CO2 | SC | 427.5 | 80.0 | 1000.0 | −2374.7 |
| 1005 | Cool Low-Pressure PCF Stream | CO2 | SC | 64.6 | 79.9 | 1000.0 | −2494.9 |
| 1006 | Cold Low-Pressure PCF Stream | CO2 | SC | 20.0 | 79.9 | 1000.0 | −2555.9 |
| IHT1000 | Ex EGR Blower | Air or $N_2$ | VAP | 58.8 | 1.0 | 1480.0 | 14.4 |
| IHT1002 | To E-102 | Air or $N_2$ | VAP | 331.4 | 1.0 | 1480.0 | 134.6 |
| IHT1003 | To EGR Blower | Air or $N_2$ | VAP | 58.3 | 1.0 | 1480.0 | 14.2 |

TABLE 7

Sample Energy Balance and Stream Summary for SYSTEM 004

| | | |
|---|---|---|
| Expander Inlet Temperature | 650.0 | ° C. |
| Expander Inlet Pressure | 450 | bara |
| Reheat Temperature | 650.0 | ° C. |
| scCO2 Circulation Rate | 1000.0 | T/hr |
| Assumed Heat Loss | 1.0% | |
| Overall Cycle Efficiency | 48.44% | |
| Energy Streams | | |
| Primary Heat Input Including Loss | 124.3 | MW |
| Gross Turbine Power | 75.19 | MW |
| scPump Power | 12.47 | MW |
| Other House Loads | 1.50 | MW |
| EGR Blower Power | 0.21 | MW |
| Hot EGR Blower Power | 0.81 | MW |
| Tertiary Cooler Heat Rejection | 61.3 | MW |
| Net Power | 60.20 | MW |

| Stream No. (—) | Description (—) | Comp (—) | State (—) | Temp (° C.) | Pres (bara) | Flow Rate (T/hr) | Heat Flow (MW) |
|---|---|---|---|---|---|---|---|
| MS1000 | Primary Heat Input | Molten Salt | LIQ | 730.0 | 10.0 | 2459.8 | −2234.2 |
| MS1001 | Primary Heat Return | Molten Salt | LIQ | 656.1 | 8.0 | 2459.8 | −2357.3 |
| 1000 | Cold High-Pressure PCF Stream | CO2 | SC | 53.3 | 450.0 | 1000.0 | −2543.4 |
| 1001 | Hot High-Pressure PCF Stream | CO2 | SC | 419.5 | 449.9 | 1000.0 | −2387.8 |
| 1003 | Very Hot High-Pressure PCF Stream | CO2 | SC | 650.0 | 449.8 | 1000.0 | −2304.6 |
| 1004 | HP Expander Exhaust PCF Stream | CO2 | SC | 532.4 | 190.0 | 1000.0 | −2342.9 |
| 1005 | Reheated Expander PCF Stream | CO2 | SC | 650.0 | 189.9 | 1000.0 | −2302.2 |
| 1006 | Hot Exhaust PCF Stream | CO2 | SC | 535.7 | 80.0 | 1000.0 | −2339.1 |
| 1007 | Cool Low-Pressure PCF Stream | CO2 | SC | 65.2 | 79.9 | 1000.0 | −2494.6 |
| 1008 | Cold Low-Pressure PCF Stream | CO2 | SC | 20.0 | 79.9 | 1000.0 | −2555.9 |
| IHT1000 | Ex EGR Blower | Air or $N_2$ | VAP | 58.8 | 1.0 | 1414.0 | 13.8 |
| IHT1002 | To E-102 | Air or $N_2$ | VAP | 425.0 | 1.0 | 1414.0 | 169.3 |
| IHT1003 | To EGR Blower | Air or $N_2$ | VAP | 58.3 | 1.0 | 1414.0 | 13.6 |
| IHT1004 | Ex Hot EGR Blower | Air or $N_2$ | VAP | 540.3 | 1.0 | 900.0 | 140.1 |
| IHT1005 | To E-101 | Air or $N_2$ | VAP | 716.9 | 1.0 | 900.0 | 190.8 |

TABLE 7-continued

Sample Energy Balance and Stream Summary for SYSTEM 004

| IHT1006 | To E-106 | Air or N$_2$ | VAP | 424.5 | 1.0 | 900.0 | 107.6 |
|---|---|---|---|---|---|---|---|
| IHT1007 | To E-107 | Air or N$_2$ | VAP | 679.6 | 1.0 | 900.0 | 180.0 |
| IHT1008 | To Hot EGR Blower | Air or N$_2$ | VAP | 537.4 | 1.0 | 900.0 | 139.3 |

TABLE 8

Sample Energy Balance and Stream Summary for SYSTEM 005

| | | |
|---|---|---|
| Expander Inlet Temperature | 650.0 | ° C. |
| Expander Inlet Pressure | 450 | bara |
| Reheat Temperature | 650.0 | ° C. |
| scCO2 Circulation Rate | 1000.0 | T/hr |
| Assumed Heat Loss | 1.0% | |
| Overall Cycle Efficiency | 48.77% | |
| Energy Streams | | |
| Primary Heat Input Including Loss | 125.1 | MW |
| Gross Turbine Power | 75.19 | MW |
| scPump Power | 12.47 | MW |
| Other House Loads | 1.50 | MW |
| EGR Blower Power | 0.21 | MW |
| Hot EGR Blower Power | N/A | MW |
| Tertiary Cooler Heat Rejection | 61.3 | MW |
| Net Power | 61.01 | MW |

| Stream No. (—) | Description (—) | Comp (—) | State (—) | Temp (° C.) | Pres (bara) | Flow Rate (Tonne/hr) | Heat Flow (MW) |
|---|---|---|---|---|---|---|---|
| MS1000 | Primary Heat Input | Molten Salt | LIQ | 730.0 | 10.0 | 1001.4 | −909.6 |
| MS1001 | Primary Heat Return | Molten Salt | LIQ | 545.8 | 10.0 | 1001.4 | −1033.4 |
| 1000 | Cold High-Pressure PCF Stream | CO2 | SC | 53.3 | 450.0 | 1000.0 | −2543.4 |
| 1001 | Hot High-Pressure PCF Stream | CO2 | SC | 419.5 | 449.9 | 1000.0 | −2387.8 |
| 1003 | Very Hot High-Pressure PCF Stream | CO2 | SC | 650.0 | 449.8 | 1000.0 | −2304.6 |
| 1004 | HP Expander Exhaust PCF Stream | CO2 | SC | 532.4 | 190.0 | 1000.0 | −2342.9 |
| 1005 | Reheated Expander PCF Stream | CO2 | SC | 650.0 | 189.9 | 1000.0 | −2302.2 |
| 1006 | Hot Exhaust PCF Stream | CO2 | SC | 535.7 | 80.0 | 1000.0 | −2339.1 |
| 1007 | Cool Low-Pressure PCF Stream | CO2 | SC | 65.2 | 79.9 | 1000.0 | −2494.6 |
| 1008 | Cold Low-Pressure PCF Stream | CO2 | SC | 20.0 | 79.9 | 1000.0 | −2555.9 |
| IHT1000 | Ex EGR Blower | Air or N2 | VAP | 58.8 | 1.0 | 1414.0 | 13.8 |
| IHT1002 | To E-102 | Air or N2 | VAP | 425.0 | 1.0 | 1414.0 | 169.3 |
| IHT1003 | To EGR Blower | Air or N2 | VAP | 58.3 | 1.0 | 1414.0 | 13.6 |

TABLE 9

Sample Energy Balance and Stream Summary for SYSTEM 006

| | | |
|---|---|---|
| Expander Inlet Temperature | 650.0 | ° C. |
| Expander Inlet Pressure | 450 | bara |
| Reheat Temperature | 650.0 | ° C. |
| scCO2 Circulation Rate | 685.0 | T/hr |
| Assumed Heat Loss | 1.0% | |
| Overall Cycle Efficiency | 53.07% | |
| Energy Streams | | |
| Primary Heat Input Including Loss | 101.8 | MW |
| Gross Turbine Power | 75.20 | MW |
| scPump Power | 8.54 | MW |
| Hot scPump Power | 10.64 | MW |
| Other House Loads | 1.50 | MW |
| EGR Blower Power | 0.48 | MW |
| Hot EGR Blower Power | N/A | MW |
| Tertiary Cooler Heat Rejection | 45.3 | MW |
| Net Power | 54.03 | MW |

| Stream No. (—) | Description (—) | Comp (—) | State (—) | Temp (° C.) | Pres (bara) | Flow Rate (T/hr) | Heat Flow (MW) |
|---|---|---|---|---|---|---|---|
| MS1000 | Primary Heat Input | Molten Salt | LIQ | 730.0 | 10.0 | 1001.6 | −909.8 |
| MS1001 | Primary Heat Return | Molten Salt | LIQ | 580.6 | 10.0 | 1001.6 | −1010.6 |
| 1000 | Cold High-Pressure PCF Stream | CO2 | SC | 53.3 | 450.0 | 685.0 | −1742.3 |

TABLE 9-continued

Sample Energy Balance and Stream Summary for SYSTEM 006

| 1001 | 1st Warm High-Pressure PCF Stream | CO2 | SC | 240.2 | 450.0 | 685.0 | −1682.4 |
|---|---|---|---|---|---|---|---|
| 1003 | Hot High-Pressure PCF Stream | CO2 | SC | 483.2 | 450.0 | 1000.0 | −2364.7 |
| 1005 | Very Hot High-Pressure PCF Stream | CO2 | SC | 650.0 | 449.9 | 1000.0 | −2304.6 |
| 1006 | HP Expander Exhaust PCF Stream | CO2 | SC | 532.4 | 190.0 | 1000.0 | −2342.9 |
| 1007 | Reheated Expander PCF Stream | CO2 | SC | 650.0 | 189.9 | 1000.0 | −2302.2 |
| 1008 | Hot Exhaust PCF Stream | CO2 | SC | 535.7 | 80.0 | 1000.0 | −2339.1 |
| 1009 | Cool Low-Pressure PCF Stream | CO2 | SC | 75.5 | 80.0 | 1000.0 | −2489.8 |
| 1011 | 1st Cool Low-Pressure PCF Stream | CO2 | SC | 75.5 | 80.0 | 685.0 | −1705.5 |
| 1012 | Cold Low-Pressure PCF Stream | CO2 | SC | 20.0 | 80.0 | 685.0 | −1750.8 |
| 1101 | 2nd Cool Low-Pressure PCF Stream | CO2 | SC | 75.5 | 80.0 | 315.0 | −784.3 |
| 1102 | 2nd Warm High-Pressure PCF Stream | CO2 | SC | 240.2 | 450.0 | 315.0 | −773.7 |
| 1104 | Mixed Warm High-Pressure PCF Stream | CO2 | SC | 240.2 | 450.0 | 1000.0 | −2456.1 |
| IHT1001 | To LT/HT-B | Air or $N_2$ | VAP | 59.8 | 1.0 | 1083.0 | 10.9 |
| IHT1002 | To HT-B | Air or $N_2$ | VAP | 519.8 | 1.0 | 1083.0 | 161.6 |
| IHT1003 | Ex HT-B | Air or $N_2$ | VAP | 245.2 | 1.0 | 1083.0 | 70.3 |
| IHT1005 | To EGR Blower | Air or $N_2$ | VAP | 58.3 | 1.0 | 1083.0 | 10.4 |

For simplicity and ease of description, embodiments of the present invention described herein refer to supercritical $CO_2$ as the PCF, however, any suitable working fluids at or above its critical conditions can be used. Supercritical $CO_2$ is an economic selection for the working fluid. An advantage of $CO_2$ is that its critical pressure is about 74 bar and its critical temperature is about 31° C. The critical temperature being near ambient temperature of some typical power plant locations allows external heat rejection at conditions advantageous to power cycle efficiency while maintaining the PCF fluid above or near the critical conditions. Other working fluids can include, for example, one or more hydrocarbons, chloro-hydrocarbons, fluoro-hydrocarbons, carbon tetrachloride, sulfur hexafluoride, and blends thereof can be used, as well as blends of similar gases or blends with $CO_2$. $CO_2$ is the preferred working fluid although sulfur hexafluoride has a critical pressure and temperature of about 37 bar and 45° C. and is particularly suitable.

The present disclosure further includes any one or more of the following numbered embodiments:

1. A method for generating power, comprising: a) providing two or more discreet heat transfer devices, arranged in series, and confined within one or more contained housings that are fluidly connected; b) circulating an intermediate heat transfer fluid stream through the housing and about the two or more discreet heat transfer devices; c) circulating at least a portion of a hot exhaust power cycle fluid stream about the first of the two or more discreet heat transfer devices to cool the hot exhaust power cycle fluid stream becoming a cool low-pressure power cycle fluid stream and to heat the intermediate heat transfer fluid stream; d) circulating at least a portion of the cool low-pressure power cycle fluid stream to a tertiary heat transfer device to reject residual heat from the cool low-pressure power cycle fluid stream to an external system to form a cold low-pressure power cycle fluid stream; e) pumping or compressing at least a portion of the cold low-pressure power cycle fluid stream to form a cold high-pressure power cycle fluid stream; f) circulating at least a portion of the cold high-pressure power cycle fluid stream about the second of the two or more discreet heat transfer devices to heat the cold high-pressure power cycle fluid stream and to cool the intermediate heat transfer fluid stream to from a hot high-pressure power cycle fluid stream; g) heating a primary heat transfer fluid using an external heat source to provide a heated primary heat transfer fluid; h) circulating at least a portion of the heated primary heat transfer fluid to a heat transfer device to further heat the hot high-pressure power cycle fluid stream to form a very hot high-pressure power cycle fluid stream; i) circulating the very-hot high-pressure power cycle fluid stream to an expansion turbine device to form the said hot exhaust power cycle fluid stream and generate power.

2. The method of Embodiment 1, 7, 12 or 14 in which the intermediate heat transfer fluid is dry air, humid air, nitrogen, argon, any other constituent of air, water, steam, a hydrocarbon fluid in any state, a molten salt, a liquid metal or another heat transfer fluid and/or in which the power cycle fluid is a supercritical fluid, such as supercritical carbon dioxide.

3. The method of Embodiment 1 that includes circulating at least a portion of the intermediate heat transfer fluid about the two or more discreet heat transfer devices by using a blower, compressor, pump or natural circulation via temperature difference or other natural convection means.

4. The method of Embodiment 1 in which the two or more discreet heat transfer devices are not confined within a common contained housing but are confined within two or more separate contained housings that are fluidly connected in series.

5. The method of Embodiment 3 in which the flow rate of the intermediate heat transfer fluid can be adjusted by using a variable speed and/or variable blade pitch device with the blower, compressor or pump or by using a variable flow restriction device with the blower, compressor, pump or natural circulation.

6. The method of Embodiment 5 that includes measuring two or more temperatures and adjusting the flow rate of the intermediate heat transfer fluid until the sum and/or difference of the two or more temperatures equals a desired setpoint value.

7. A method for generating power, comprising: a) providing a first group of two or more discreet heat transfer devices, arranged in series, and confined within a first contained housing; b) circulating a first intermediate heat transfer fluid stream through the first housing or first group of housings and about the first group of two or more discreet heat transfer devices; c) circulating at least a portion of a hot exhaust power cycle fluid stream about the first of the two or more discreet heat transfer devices of the said first group to cool the hot exhaust power cycle fluid stream becoming a cool low-pressure power cycle fluid stream and to heat the first intermediate heat transfer fluid stream; d) circulating at least a portion of the cool low-pressure power cycle fluid stream to a tertiary heat transfer device to reject residual heat from the cool low-pressure power cycle fluid stream to an external system to form a cold low-pressure power cycle fluid stream; e) pumping or compressing at least a portion of the cold low-pressure power cycle fluid stream to form a cold high-pressure power cycle fluid stream; f) circulating at least a portion of the cold high-pressure power cycle fluid stream about the second of the two or more discreet heat transfer devices of the said first group to heat the cold high-pressure power cycle fluid stream and to cool the first intermediate heat transfer fluid stream to from a hot high-pressure power cycle fluid stream; g) heating a primary heat transfer fluid using an external high value heat source to provide a heated primary heat transfer fluid; h) providing a second group of two or more discreet heat transfer devices, arranged in series, and confined within a second contained housing; i) circulating a second intermediate heat transfer fluid stream through the housing or second group of housings and about the two or more other discreet heat transfer devices of the second group; j) circulating at least a portion of the heated primary heat transfer fluid to the first discreet heat transfer device of the second group to heat the second intermediate heat transfer fluid stream; k) circulating the hot high-pressure power cycle fluid stream to the second discreet heat transfer device of the second group causing the hot high-pressure power cycle fluid stream to be further heated to form a very hot high-pressure power cycle fluid stream and cooling the second intermediate heat transfer fluid stream; 1) circulating the very-hot high-pressure power cycle fluid stream to an expansion turbine device to form the said hot exhaust power cycle fluid stream thereby generating power, wherein the power cycle fluid stream is a supercritical fluid, such as supercritical carbon dioxide.

8. The method of Embodiment 7 that includes circulating the first intermediate heat transfer fluid stream about the first group of the two or more discreet heat transfer devices by using a blower, compressor, pump or natural circulation via temperature difference and/or circulating the second intermediate heat transfer fluid stream about the second group of two or more discreet heat transfer devices by using a blower, compressor, pump or natural circulation via temperature difference.

9. The method of Embodiment 7 in which the first group of two or more discreet heat transfer devices are not confined within a common contained housing but are confined within two or more separate contained housings that are fluidly connected in series and/or the second group of two or more discreet heat transfer devices are not confined within a common contained housing but are confined within two or more separate contained housings that are fluidly connected in series.

10. The method of Embodiment 9 in which the flow rate of the first intermediate heat transfer fluid stream and/or the second intermediate heat transfer fluid stream can be adjusted by using a variable speed and/or variable blade pitch device with the associated blower, compressor or pump, by using a variable flow restriction device with the associated blower, compressor, pump or natural circulation.

11. The method of Embodiment 10 that includes measuring two or more temperatures and adjusting the flow rate of the first intermediate heat transfer fluid stream until the sum and/or difference of the two or more temperatures equals a desired setpoint value and/or the flow rate of the second intermediate heat transfer fluid stream until the sum and/or difference of the two or more temperatures equals a desired setpoint value.

12. The method of Embodiment 7 in which the first group of two or more discreet heat transfer devices and the second group two or more discreet heat transfer devices are fluidly connected providing a flow path for mixing of the first and second intermediate heat transfer fluids flowing about the first and second groups of two or more discreet heat transfer devices.

13. The method of Embodiment 12 in which circulating the first intermediate heat transfer fluid stream and the second intermediate heat transfer fluid stream is by a single blower, compressor and/or pump.

14. A method for generating power, comprising: a) providing three or more discreet heat transfer devices, arranged in series, and confined within one or more contained housings that are fluidly connected; b) circulating an intermediate heat transfer fluid stream in series through the one or more housings and about the three or more discreet heat transfer devices; c) circulating at least a portion of a hot exhaust power cycle fluid stream to the first of the three or more discreet heat transfer devices to cool the hot exhaust power cycle fluid stream becoming a cool low-pressure power cycle fluid stream and to heat the intermediate heat transfer fluid stream; d) separating the cool low-pressure power cycle fluid stream into at least a first portion and a second portion; e) circulating the first portion of the cool low-pressure power cycle fluid stream to a tertiary heat transfer device to reject residual heat from the power cycle fluid stream to an external system to form a cold low-pressure power cycle fluid stream; f) pumping or compressing at least a portion of the cold low-pressure power cycle fluid stream to form a cold high-pressure power cycle fluid stream; g) circulating at least a portion of the cold high-pressure power cycle fluid stream to the third of the three or more discreet heat transfer devices to heat the cold high-pressure power cycle fluid stream and to cool the intermediate heat transfer fluid stream to from a $1^{st}$ warm high-pressure power cycle fluid stream; h) pumping or compressing the second portion of the cool low-pressure power cycle fluid stream to form a $2^{nd}$ warm high-pressure power cycle fluid stream; i) mixing the $1^{st}$ warm high-pressure power cycle fluid stream and the $2^{nd}$ warm high-pressure power cycle fluid stream to form a mixed warm high-pressure power cycle fluid stream; j) circulating the mixed warm high-pressure power cycle fluid stream to the second of the three or more discreet heat transfer devices to form a hot high-pressure power cycle fluid stream; k) circulating and heating a primary heat transfer fluid using an external heat source to provide a heated primary heat transfer fluid; h) circulating at least a portion of the heated primary heat transfer fluid to a heat transfer device to further heat the hot high-pressure power cycle fluid stream to form a very hot high-pressure power cycle fluid stream; i) circulating the very-hot high-pressure power cycle fluid stream to an expansion turbine device to form the said exhaust power cycle fluid stream and generate power, wherein the power cycle fluid is a supercritical fluid, such as supercritical carbon dioxide.

15. The method of Embodiment 1, 7, 12 or 14 in which the expansion device is divided into two or more stages with each stage expanding the very-hot high pressure power cycle fluid stream to a lower pressure in steps until the pressure of the power cycle fluid stream exiting the last expansion stage equals the approximate pressure of the hot exhaust power cycle fluid stream and further heating the power cycle fluid stream at each step by circulating it to other discreet heat transfer devices.

16. The method of Embodiment 15 in which the other discreet heat transfer devices heat the power cycle fluid stream at a stage by exchanging heat directly with at least a portion of the primary heat transfer fluid or by exchanging heat with the first or second intermediate heat transfer fluid stream.

17. The method of Embodiment 14 that includes circulating the intermediate heat transfer fluid stream about the three or more discreet heat transfer devices by using a blower, compressor, pump or natural circulation via temperature difference.

18. The method of Embodiment 17 in which the flow rate of the intermediate heat transfer fluid stream can be adjusted by using a variable speed and/or variable blade pitch device with the blower, compressor or pump and/or by using a variable flow restriction device 19. The method of Embodiment 18 that includes measuring two or more temperatures and adjusting the flow rate of the intermediate heat transfer fluid stream until the sum and/or difference of the two or more temperatures equals a desired setpoint value.

20. The method of Embodiment 14 in which the second portion of the cool low-pressure power cycle fluid stream is pumped or compressed by use of a pump, supercritical pump or a compressor.

21. The method of Embodiment 20 in which the flow rate of the second portion of the cool low-pressure power cycle fluid stream can be adjusted by using a variable speed and/or variable blade pitch device with the pump, supercritical pump or compressor and/or by using a variable flow restriction device.

22. The method of Embodiment 21 that includes measuring two or more temperatures and adjusting the flow rate of the second portion of the cool low-pressure power cycle fluid stream until the sum and/or difference of the two or more temperatures equals a desired setpoint value.

23. The methods of Embodiments 19 and 22 comprising adjusting the flow rate of the intermediate heat transfer fluid stream and adjusting the flow rate of the second portion of the cool low-pressure power cycle fluid stream sequentially or simultaneously thereby changing the efficiency of the power generation method.

24. The methods of Embodiment 23 comprising a multivariable control system.

25. The methods of Embodiments 1, 7 and/or 14 replacing at least a portion of the primary heat transfer fluid with a combustion or thermal reaction effluent.

26. The method of Embodiment 25 comprising at least one of a catalytic process, a catalyst system and a heat exchange device comprising a catalyst system.

Certain embodiments and features have been described using a set of numerical upper limits and a set of numerical lower limits. It can be appreciated that ranges from any lower limit to any upper limit are contemplated unless otherwise indicated. Certain lower limits, upper limits and ranges appear in one or more claims below. All numerical values are "about" or "approximately" the indicated value, and consider experimental error and variations that would be expected by a person having ordinary skill in the art.

Various terms have been defined above. To the extent a term used in a claim is not defined above, it can be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

We claim:

1. A method for generating power, comprising:
   a) providing three or more heat transfer devices, arranged in series, and confined within one or more contained housings that are fluidly connected;
   b) circulating an intermediate heat transfer fluid stream in series through the one or more housings and about the three or more heat transfer devices;
   c) circulating at least a portion of a hot exhaust power cycle fluid stream to a first of the three or more heat transfer devices to cool the hot exhaust power cycle fluid stream to form a cool low-pressure power cycle fluid stream and to heat the intermediate heat transfer fluid stream;
   d) separating the cool low-pressure power cycle fluid stream into at least a first portion and a second portion;
   e) circulating the first portion of the cool low-pressure power cycle fluid stream to a tertiary heat transfer device to reject residual heat from the power cycle fluid stream to an external system to form a cold low-pressure power cycle fluid stream;
   f) pumping or compressing at least a portion of the cold low-pressure power cycle fluid stream to form a cold high-pressure power cycle fluid stream;
   g) circulating at least a portion of the cold high-pressure power cycle fluid stream to a third of the three or more heat transfer devices to heat the cold high-pressure power cycle fluid stream to form a $1^{st}$ warm high-pressure power cycle fluid stream and to cool the intermediate heat transfer fluid stream;
   h) pumping or compressing the second portion of the cool low-pressure power cycle fluid stream to form a $2^{nd}$ warm high-pressure power cycle fluid stream;
   i) mixing the $1^{st}$ warm high-pressure power cycle fluid stream and the $2^{nd}$ warm high-pressure power cycle fluid stream to form a mixed warm high-pressure power cycle fluid stream;
   j) circulating the mixed warm high-pressure power cycle fluid stream to a second of the three or more heat transfer devices to form a hot high-pressure power cycle fluid stream;
   k) circulating and heating a primary heat transfer fluid using an external heat source to provide a heated primary heat transfer fluid;
   l) circulating at least a portion of the heated primary heat transfer fluid to a heat transfer device to further heat the hot high-pressure power cycle fluid stream to form a very hot high-pressure power cycle fluid stream; and
   m) circulating the very-hot high-pressure power cycle fluid stream to an expansion turbine device to form the hot exhaust power cycle fluid stream and generate power.

2. The method of claim 1 further comprising circulating the intermediate heat transfer fluid stream about the three or more heat transfer devices by using a blower, compressor, pump or natural circulation via temperature difference.

3. The method of claim 2 wherein the flow rate of the intermediate heat transfer fluid stream can be adjusted by using a variable speed and/or variable blade pitch device with the blower, compressor or pump and/or by using a variable flow restriction device.

4. The method of claim 1 wherein the second portion of the cool low-pressure power cycle fluid stream is pumped or compressed by use of a pump, supercritical pump or a compressor.

5. The method of claim 4 wherein the flow rate of the second portion of the cool low-pressure power cycle fluid stream can be adjusted by using a variable speed and/or variable blade pitch device with the pump, supercritical pump or compressor and/or by using a variable flow restriction device.

6. The method of claim 1, further comprising measuring two or more temperatures and adjusting the intermediate heat transfer fluid flow rate until the sum or difference or both the sum and difference of the two or more temperatures equals a desired setpoint value.

7. The method of claim 6 further comprising adjusting the flow rate of the intermediate heat transfer fluid stream and adjusting the flow rate of the second portion of the cool low-pressure power cycle fluid stream sequentially or simultaneously thereby changing the efficiency of the power generation method.

8. The method of claim 7 further comprising a multi-variable control system to adjust the flow rates.

9. The method of claim 1 further comprising measuring two or more temperatures and adjusting the flow rate of the second portion of the cool low-pressure power cycle fluid stream until the sum or difference or both the sum and difference of the two or more temperatures equals a desired setpoint value.

10. The method of claim 1, wherein the intermediate heat transfer fluid is dry air, humid air, nitrogen, argon, or any other constituent of air, water, steam, or hydrocarbons, a molten salt, or a liquid metal.

11. The method of claim 1 wherein at least a portion of the primary heat transfer fluid is a combustion or thermal reaction effluent.

12. The method of claim 11 further comprising at least one of a catalytic process, a catalyst system and a heat exchange device comprising a catalyst system.

13. The method of claim 1 wherein the power cycle fluid is a supercritical fluid.

14. The method of claim 1 wherein the power cycle fluid is supercritical carbon dioxide.

15. The method of claim 1 wherein the expansion turbine device is divided into two or more stages.

16. The method of claim 15 further comprising heating the power cycle fluid stream exiting at least one stage prior to entering a later stage.

17. The method of claim 1 wherein the primary heat transfer fluid is a molten salt, heat transfer oil, hydrogen, an inert gas, air, any constituent of air, liquid metal or a hydrocarbon fluid.

* * * * *